(12) United States Patent
Takano

(10) Patent No.: US 11,685,576 B2
(45) Date of Patent: Jun. 27, 2023

(54) LID

(71) Applicant: KY7 INC., Tokyo (JP)

(72) Inventor: Akira Takano, Machida (JP)

(73) Assignee: KY7 INC., Tokyo (JP)

( * ) Notice: Subject to any disclaimer, the term of this patent is extended or adjusted under 35 U.S.C. 154(b) by 0 days.

(21) Appl. No.: 17/637,131

(22) PCT Filed: Jan. 12, 2021

(86) PCT No.: PCT/JP2021/000737
§ 371 (c)(1),
(2) Date: Feb. 22, 2022

(87) PCT Pub. No.: WO2021/141139
PCT Pub. Date: Jul. 15, 2021

(65) Prior Publication Data
US 2022/0281650 A1    Sep. 8, 2022

(30) Foreign Application Priority Data

Jan. 10, 2020 (JP) .............................. JP2020-012012

(51) Int. Cl.
*B65D 43/02* (2006.01)
(52) U.S. Cl.
CPC ................... *B65D 43/0212* (2013.01); *B65D 2543/00046* (2013.01); *B65D 2543/00092* (2013.01); *B65D 2543/00268* (2013.01)
(58) Field of Classification Search
CPC .............. B65D 47/103; B65D 43/0212; B65D 43/0204; B65D 2543/00268; B65D 2543/00092; B65D 2543/00046
(Continued)

(56) References Cited

U.S. PATENT DOCUMENTS 4,253,582 A * 3/1981 Shields .............. B65D 17/4012
220/269
4,433,808 A    2/1984 Gordon et al.
(Continued)

FOREIGN PATENT DOCUMENTS

JP    S59-37151 A    2/1984
JP    H07-17554 A    1/1995
(Continued)

OTHER PUBLICATIONS

Mar. 23, 2021 International Search Report issued in International Patent Application No. PCT/JP2021/000737.
(Continued)

*Primary Examiner* — James N Smalley
*Assistant Examiner* — Madison L Poos
(74) *Attorney, Agent, or Firm* — Oliff PLC

(57) ABSTRACT

A lid is capable of easily taking out contents from an opening portion thereof, while securing sealability of a container. The lid includes a top lid made of a paper-based material, the top lid including: an opening portion communicating between the inside and the outside of the top lid; a lid piece formed to be capable of opening or closing the opening portion; and a holding portion for holding the lid piece in a state where the opening portion is opened; and the lid includes a holding reception portion configured to hold the holding portion in a state where the opening portion is opened.

18 Claims, 30 Drawing Sheets

(58) Field of Classification Search
USPC .............. 222/541.6; 220/270, 269, 268, 266
See application file for complete search history.

(56) References Cited

U.S. PATENT DOCUMENTS

| | | | | |
|---|---|---|---|---|
| 5,411,159 A * | 5/1995 | Fan | .................... | B65D 17/4012 |
| | | | | 220/269 |
| 5,647,500 A * | 7/1997 | Konno | .................... | B65D 5/708 |
| | | | | 229/123.1 |
| 6,062,414 A * | 5/2000 | Mongarli | ........... | B65D 17/4012 |
| | | | | 220/269 |
| 6,471,122 B1 * | 10/2002 | Stewart | ................ | B65D 51/222 |
| | | | | 229/125.09 |
| 8,336,727 B2 * | 12/2012 | Linden | ............... | B65D 17/4012 |
| | | | | 220/268 |
| 2018/0194517 A1 | 7/2018 | Brooks | | |
| 2020/0239199 A1 | 7/2020 | Kuo et al. | | |
| 2022/0135289 A1 * | 5/2022 | Li | ........................ | B65D 47/103 |
| | | | | 222/541.6 |

FOREIGN PATENT DOCUMENTS

| | | |
|---|---|---|
| JP | 2006-248530 A | 9/2006 |
| JP | 2008-062952 A | 3/2008 |
| JP | 2020-116366 A | 8/2020 |
| JP | 3942285 B1 | 9/2021 |
| WO | 2011/082486 A1 | 7/2011 |
| WO | 2016/069755 A1 | 5/2016 |

OTHER PUBLICATIONS

Mar. 23, 2021 Written Opinion issued in International Patent Application No. PCT/JP2021/000737.
Apr. 6, 2021 Office Action issued in Japanese Patent Application No. 2021-514434.
Aug. 10, 2021 Notice of Allowance issued in Japanese Patent Application No. 2021-514434.
Nov. 14, 2022 Examination Report in Australian Application 2021206361.
Oct. 17, 2022 Office Action issued in Canadian Application No. 3,164,181.
Oct. 31, 2022 Search Report issued in European Application No. 21738581.4.
Sep. 26, 2022 Decision for Grant of Patent in Korean Application No. 10-2022-7008156.
Nov. 2, 2022 Examination Report in New Zealand Application No. 791181.
Jun. 23, 2022 Office Action issued in Korean Patent Application No. 10-2022-7008156.
Aug. 5, 2022 Office Action issued in India Patent Application No. 202247020345.
Jan. 23, 2023 Office Action issued in Brazilian Patent Application No. BR112022013610-2.

* cited by examiner

LID

TECHNICAL FIELD

The present invention relates to a lid formed to be able to close an opening portion of a container.

BACKGROUND ART

In a convenience store, a supermarket, and the like, food and drink products such as various kinds of beverages and side dishes are sold being put in simple containers. Conventionally, in these stores, there have been many cases in which food and drink products are contained in containers in advance, and displayed for sale at the store with lids closing opening portions of the containers. However, in recent years, in addition to the above-described form of selling, it has been widely done as another form of selling that a purchaser puts various kinds of beverage such as coffee into a cup-shaped container in a store and then puts a lid on the cup-shaped container to take out. Thus, in recent years, various lids have been proposed to prevent the contents (e.g., various kinds of beverages such as coffee) in containers from overflowing in a better way when holding the containers with hands as compared with the conventional ones.

As this type of lid, a molded article using a plastic material has been widely used according to the conventional art. However, in recent years, since plastic products may cause various environmental problems, it has been widely demanded to reduce an amount of plastic materials used as raw materials for forming simple containers and lids for food and drink products that are disposable in a short time. For this reason, in recent years, lids formed using pulp materials or paper materials have also been proposed to replace lids formed using plastic materials (e.g., Patent Literatures 1 and 2).

CITATION LIST

Patent Literature

Patent Literature 1: JP 2006-248530 A
Patent Literature 2: JP 2020-116366 A

SUMMARY OF INVENTION

Technical Problem

However, in general, the paper materials have lower elasticity and moldability than the plastic materials, and thus are difficult to mold into complicated shapes as is the case with the plastic materials. Therefore, it has not been easy to form, using a pulp material or a paper material, a lid capable of reliably closing an opening portion of a container to improve the sealability of the inside of the container when closing the opening portion, while having a shape or a structure not causing leakage to the outside of the container even when the contents of the container are liquid, as is the case with the lid formed of the plastic material.

Conventionally, various structural ideas have been devised for a lid capable of improving a sealing property to an opening portion of a container using a paper material. Patent Literature 1 discloses a lid including a wall surface portion having a conical outer surface to be engaged with an inner surface of a conical main body portion of a paper container, and a top lid portion surrounded by the wall surface portion, the lid being configured to be fitted onto an inner side of an opening portion of the container. In addition, Patent Literature 2 discloses a lid formed using pulp molded paper for a beverage cup. Further, in the lid disclosed in Patent Literature 2, an opening is formed as a beverage outlet for the contents (e.g., a beverage such as coffee) in the container to be discharged to the outside of the container in a state where the container is closed.

However, it is difficult to say that the lid disclosed in Patent Literature 1 has a sufficient sealing property between the opening portion of the container and the wall surface portion of the lid when closing the container, and there is a possibility that the liquid in the container leaks out. In a case where a lid and a container are made of paper, due to the characteristics of the paper material, it is likely that variations occur in the dimensions of the lid and the opening portion of the container because they are influenced by humidity and the like. Meanwhile, since the conventional paper lid is formed in a structure in which the side wall and the top lid overlap each other, or the side wall is reinforced by a reinforcing material, a portion of the lid to be fitted onto the opening portion of the container is hard. Thus, a portion of the lid to be engaged with the opening portion of the container has poor elasticity. Therefore, when minute variations occur in the dimensions of the lid and the opening portion of the container, the container cannot be reliably closed, resulting in a problem that it is difficult to secure stable sealability.

In addition, when the container contains a beverage, an opening is formed in the lid as a beverage outlet in many cases, for example, as in the lid disclosed in Patent Literature 2. However, when the beverage outlet is formed in this way, even though sealability between the container and the lid is secured, there is also a problem that the contents may suddenly pop out from the beverage outlet while carrying the beverage. It seems that such a problem can be solved if the beverage outlet is also configured to be closed while carrying the beverage. However, in a case where the beverage outlet is closed in this manner, the closed beverage outlet needs to be opened when the contents are drunk, or the like. This causes another problem that complexity increases. Concerning this type of problem, it may also be considered to push a closing body (lid piece) closing the beverage outlet into the container to open the beverage outlet. However, it is difficult to say that it is hygienic to open the beverage outlet by pushing the lid piece into the container in this way. In addition, if the beverage outlet is opened by pulling up the lid piece outwardly, this causes another problem that the operation for pulling up the lid piece is complicated, or the structure or shape of the lid itself is complicated in order to easily pull up the lid piece.

The present invention has been made in view of such problems, and an object of the present invention is to provide a lid capable of easily taking out contents from an opening portion thereof, while securing sealability of a container.

Solution to Problem

The gist of the present invention is as follows.
(1) A lid including a top lid made of a paper-based material, in which the top lid includes: an opening portion communicating between the inside and the outside of the top lid; a lid piece formed to be capable of opening or closing the opening portion; and a holding portion for holding the lid piece in a state where the opening portion is opened; and the lid is provided with a holding reception portion configured to hold the holding portion in a state where the opening portion is opened.

(2) The lid according to (1), in which a seal member for pulling up the lid piece to open the opening portion is connected to the lid piece.

(3) The lid according to (2), in which the holding portion is formed in the seal member.

(4) The lid according to (1), in which the holding portion is formed in a claw shape, and the holding reception portion is formed in a cut shape in the top lid, so that the holding portion is insertable into the holding reception portion.

(5) The lid according to (1), further including a side wall portion formed circumferentially to surround a periphery of the top lid, in which the holding reception portion is formed in the side wall portion.

(6) The lid according to (5), in which the holding reception portion is the side wall portion.

Advantageous Effects of Invention

The lid according to the present invention includes a top lid made of a paper-based material. The top lid includes: an opening portion communicating between the inside and the outside of the top lid; a lid piece formed to be capable of opening or closing the opening portion; a holding portion for holding the lid piece in a state where the opening portion is opened; and a holding reception portion configured to hold the holding portion in a state where the opening portion is opened. Therefore, by operating the holding portion to pull up the lid piece, the opening portion is opened to communicate between the inside and the outside of the top lid. Since the holding portion is held by the holding reception portion, the opening portion can be maintained in the opened state. At this time, since the holding portion is held by the holding reception portion, the lid piece can be maintained at a fixed position. For example, even in a case where a user tilts the container with the lid attached thereto to take out the contents of the container through the opening portion (e.g., when drinking a beverage), the lid piece can be maintained at the fixed position without falling toward the opening portion. Therefore, when the user tilts the container with the lid attached thereto, the lid piece does not touch the user's face (nose or the like), so that the user can comfortably take out the contents (dink the beverage) without feeling discomfort.

Further, according to the lid of the present invention, since the lid piece is pulled up by operating the holding portion, the opening portion can be opened without touching a back surface side of the lid piece. Therefore, since the user's finger does not touch the contents attached to, for example, the back surface of the lid piece, the user can perform a comfortable operation at the time of opening the opening portion. In addition, in this lid, the lid piece can be pulled up by only operating the holding portion. Therefore, it is also possible to pull up the lid piece by performing a simple operation.

Furthermore, according to the lid of the present invention, the lid piece can also be operated in an opening portion closing direction by operating the holding portion that is being held by the holding reception portion. Therefore, the lid piece opening/closing operation can be performed multiple times in a simple way by operating the holding portion, and thus, the lid piece can be closed in a simple way even when the contents in the container, e.g., a beverage are not completely drunk in a short time, and the closed state can be continuously maintained. Further, according to the present invention, it is possible to provide a lid capable of considering environmental problems.

DESCRIPTION OF EMBODIMENTS

Hereinafter, a lid according to the present invention will be described in detail with reference to the drawings. Note that the lid according to the present invention will be described by exemplifying a lid used for a container (cup) for containing various kinds of beverage such as a coffee cup, but is not limited to the lid of the container for containing the beverage, and can also be applied as a lid 1 of a container for containing a food item other than the beverage. In addition, the lid according to the present invention can also be applied as a lid applicable to a container for containing various kinds of articles other than food and beverage, for example, parts such as a bolt, a nut and the like, or articles other than those described above. In addition, the lid according to the present invention will be described using an example where the lid has a circular shape in plan view, but the shape of the lid is not limited to the circular shape, and can be applied to a shape other than the circular shape, such as an elliptical shape, a rectangular shape, a triangular shape, a polygonal shape, a chamfered rectangular shape, a chamfered polygonal shape, or the like.

As illustrated in FIGS. 1 to 6, the lid 1 includes a top lid 2 and a side wall 3 formed circumferentially to surround a periphery of the top lid. The side wall 3 is formed in a cylindrical shape by circumferentially joining opposite end parts of a paper-based material together. The side wall 3 is formed in a tapered shape from an upper end thereof toward a lower end thereof. Here, the "tapered shape" means that an outer wall of the side wall 3 is formed in the tapered shape overall from the upper end thereof toward the lower end thereof. The "tapered shape" includes a shape in which the outer wall of the side wall 3 gradually decreases in dimension from the upper end thereof toward the lower end thereof, and also includes a shape in which the outer wall of the side wall 3 is tapered overall even if there is a bulging portion, a protruding portion, or the like in part of the outer wall of the side wall 3, or the bulging portion or the protruding portion is formed therein. In addition, the "tapered shape" also includes a shape in which the outer wall of the side wall 3 is formed in a tapered shape overall even if the side wall 3 has a straight cylindrical shape with a part of the side wall 3 being not formed in the tapered shape. That is, the "tapered shape" here is a concept including a shape that a part of the outer wall has a shape different from the tapered shape, as long as the outer wall of the side wall 3 has the tapered shape as a whole of the side wall.

Figure 8:
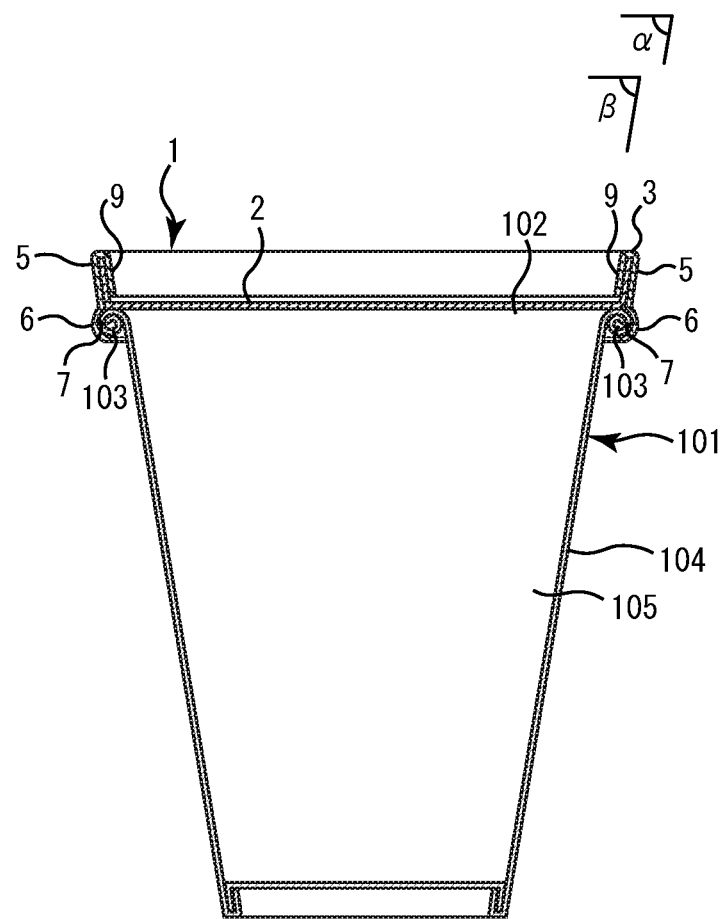
FIG. 8 is an explanatory view illustrating a state in which the lid is attached to a container.

The top lid 2 has a rising portion 4 formed to be bent along a peripheral edge thereof. The side wall 3 has an upper wall 5 and a lower wall 6. The top lid 2 and the side wall 3 are integrated by joining the rising portion 4 of the top lid 2 to an inner surface side of the upper wall 5 of the side wall 3. As illustrated in FIG. 8, the lower wall 6 of the side wall 3 is provided with an engagement portion 7 formed in an annular recessed groove shape to be engaged with a curled portion 103 provided at a container opening portion 102 formed in a container 101. The engagement portion 7 is not limited to the annular recessed groove shape, and can be formed in any shape as long as the engagement portion 7 can be engaged with the curled portion 103 of the container 101. In addition, when an inner peripheral surface of the lower wall 6 of the side wall 3 is pressed such that the engagement portion 7 having the annular recessed groove shape is formed, it is possible to reduce a level difference at the joint portion in the engagement portion 7 formed on the lower wall 6 of the side wall 3, which is formed by joining both end parts of the paper-based material having a rectangular or fan shape, thereby hardly forming a gap between the lid 1 and the container 101 and improving sealability when the container 101 is closed by the lid 1. In the example illustrated in FIGS. 1 to 6, an outer side surface of the annular recessed groove-shaped engagement portion 7 (an outer side surface of the lower wall 6) formed by a pressure press or the like is formed to bulge, but the outer side surface of the lower wall 6 may not be formed to bulge while the annular recessed groove-shaped engagement portion is formed on the inner surface side of the lower wall 6. In order to reduce the level difference at the joint portion of the side wall 3, before joining both end parts of the paper-based material having the rectangular or fan shape to form the side wall 3, vicinities of both end parts may be compressed so that the thickness gradually decreases in a direction toward end edge portions (in the circumferential direction of the side wall 3). Then, both end parts may be joined together to form the side wall 3. For convenience of description, a description of a seal member, which will be described later, is omitted in FIGS. 8 to 10.

In the lid 1 of the present embodiment, the side wall 3 is formed circumferentially by joining both end parts of the fan-shaped paper-based material in which an arc length on an upper end side thereof is longer than that on a lower end side thereof. Therefore, the side wall 3 is formed in a shape in which the side surface is tapered overall from the upper end side thereof toward the lower end side thereof (in a direction toward the container opening portion 102 of the container 101) (inclined overall in a direction indicated by an arrow a in FIG. 8), such that an inner dimension on the lower end side of the engagement portion 7 is smaller than that on the upper end side of the engagement portion 7.

Figure 10:
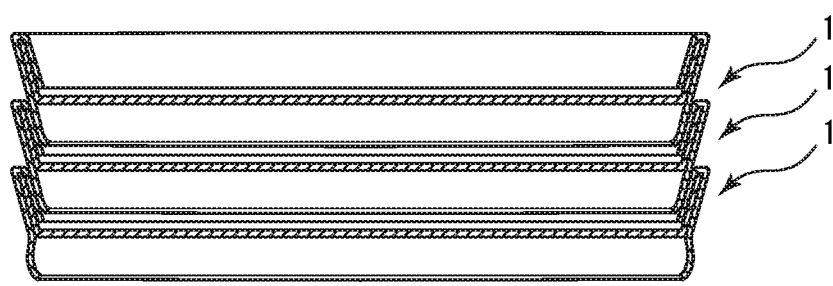
FIG. 10 is an explanatory view illustrating a state in which lids are stacked.

In the lid 1 according to the present embodiment, since the side wall 3 is formed in the tapered and inclined shape, stacking property is excellent when a plurality of lids 1 are stacked as illustrated in FIG. 10. That is, the lid 1 according to the present embodiment makes it possible to store and convey the plurality of lids 1 in a small space by vertically stacking them, thereby reducing a cost at the time of storing and conveying them. The side wall 3 is not limited to the case where the side surface is formed in the inclined shape overall, and only a part of the side wall 3, for example, the upper end side or the lower end side of the side wall 3, may be formed in the inclined shape. In addition, the upper end side and the lower end side of the side wall 3 may be formed at different inclination angles. Further, the lid 1 according to the present embodiment may be formed in a non-inclined cylindrical shape by forming the side wall 3 circumferentially using the paper-based material having the rectangular shape. Further, by using a paper-based material having an inverted fan shape, the side wall 3 can be formed to have an inclined shape in a direction opposite to the case illustrated in FIG. 10. However, it is preferable that the side wall 3 is not inclined, or the side wall 3 is inclined in a tapered shape toward the container opening portion 102 of the container 101 so as to follow an inclined angle of a side wall 104 of the container 101 as illustrated in FIG. 10. Between them, by forming the side wall 3 in the inclined cylindrical shape in such a manner that the side surface is tapered from the upper end side thereof toward the lower end side thereof, the stacking property of the lid 1 is improved, and the properties of closing and sealability of the lid 1 with respect to the container 101 are more excellent.

In the lid 1, both end parts of the paper-based member forming the cylindrical side wall 3 can be joined and the top lid 2 and the side wall 3 can be joined by a conventionally known joining method for integration. Examples of the joining method include normal adhesives, hot melt adhesives, two-liquid adhesives, heat sealing, ultrasonic bonding, high frequency bonding, and the like, and it is preferable in light of manufacturing efficiency that joining surfaces of the top lid 2 and the side wall 3 are formed of a material having heat sealability to be joined by heat sealing.

Figure 9:
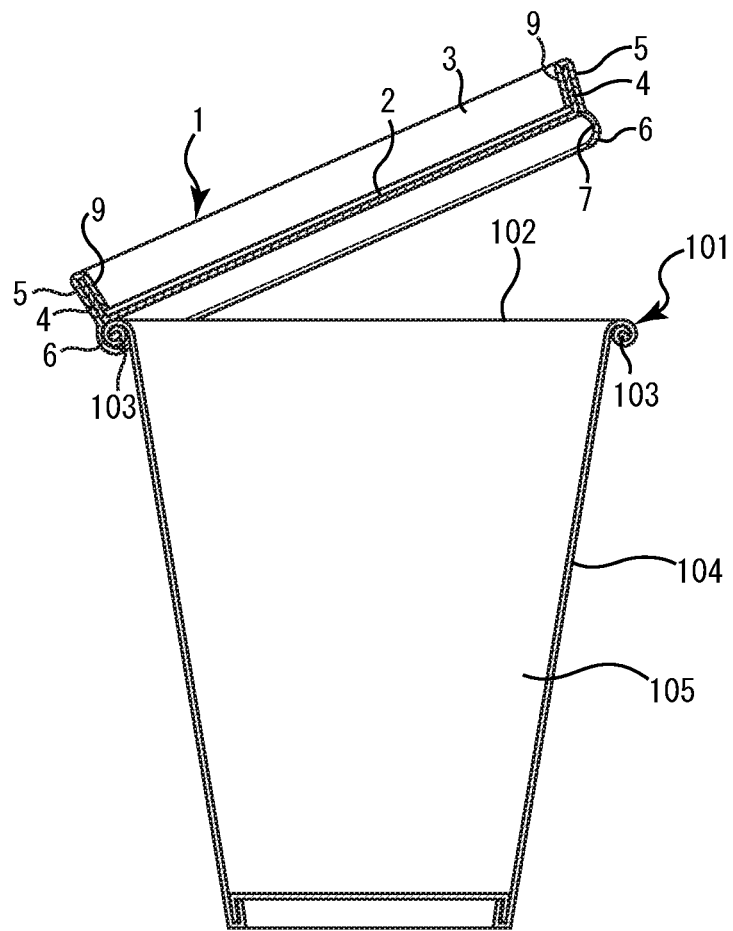
FIG. 9 is an explanatory view for describing a function and an effect when the lid is attached to the container.

FIG. 8 illustrates a state in which the container 101 has been covered with the lid 1 to seal the container opening portion 102 of the container 101, and FIG. 9 illustrates a state in which the container 101 is being covered with the lid 1. The lid 1 according to the present embodiment is formed such that the engagement portion 7 is engaged with the curled portion 103 of the container 101. The engagement portion 7 is formed in a circumferentially recessed groove shape on an inner wall side of the lower wall 6. The lid 1 according to the present embodiment is formed to have a structure in which a lower end part 8 of the lower wall 6 is not in contact with the side wall 104 of the container 101 when the engagement portion 7 is engaged with the curled portion 103 of the container 101. The lid 1 according to the present invention is not only capable of closing the container 101 with high sealability, but also easily detachable from the container 101 since the lower wall 6 has elasticity. In addition, by having a structure that the lower end part 8 of the lower wall 6 is not in contact with the side wall 104 of the container 101 when the lid 1 is attached to the container 101, a finger or the like is put on the lower end part 30 or the like of the lower wall 6 to pull up the lower wall 6 when the lid 1 is detached from the container 101, thereby releasing the engagement between the curled portion 103 of the container opening portion 102 of the container 101, the curled portion 103 of the container opening portion 102, and the engagement portion 7 of the lid 1. Then, the lid 1 can be further pulled up, thereby more easily detaching the lid 1 from the container 101.

The lid 1 according to the present invention has a configuration in which the engagement portion 7 to be engaged with the container opening portion 102 of the container 101 is formed on the lower wall 6 of the side wall 3 formed of the circumferential paper-based material. In addition, the lower wall 6 of the side wall 3 provided with the engagement portion 7 is excellent in elasticity as compared with the lower wall 6 of the side wall 3 folded to be joined to the top lid 2. Therefore, even if the engagement portion 7 of the lid 1 is designed to have a diameter smaller than an outer diameter of the curled portion 103 of the container 101, the lid 1 can be reliably engaged with the container 101. In addition, by designing the engagement portion 7 to have a diameter smaller than the outer diameter of the curled portion 103 of the container 101 as described above, even when a pressure in a space portion 105 formed in the container 101 is increased by containing a liquid product such as coffee, particularly a hot liquid product or the like, in the space portion 105, there is no concern that the lid 1 may be easily released, and the container 101 can be closed in a state where high sealability is maintained. The closing with high sealability results therefrom in addition to the shape of the side wall 3 formed to be inclined in such a manner as to be tapered overall from the upper end side thereof to the lower end side thereof.

In addition, in the lid 1 according to the present invention, since the lower wall 6 of the side wall 3 has elasticity, even if there is an error in dimension of the container opening portion 102 of the container 101, the container opening portion 102 of the container 101 can be reliably closed, thereby reliably maintaining high sealability. In addition, since the side wall 3 is inclined in a tapered shape from the upper end side thereof to the lower end side thereof, and the top lid 2 and the side wall 3 are joined for integration by joining the rising portion 4, which rises in an inclined shape in an opening-widening manner, to an inner surface 5a of the upper wall 5 of the side wall 3, joining strength between the rising portion 4 of the top lid 2 and the inner surface of the upper wall 5 of the side wall 3 is increased. In particular, in the lid 1 illustrated in FIG. 1, etc., a folded portion 9 is formed by folding the upper wall 5 of the side wall 3 onto the inner surface 4a of the rising portion 4, such that a facing surface 9a of the folded portion 9 facing the inner surface 4a is joined to the inner surface 4a of the rising portion 4. Accordingly, the above-described joining strength between the top lid 2 and the side wall 3 is further enhanced. Therefore, even when a load force is applied to the lid 1, the lid 1 is less likely to be twisted, and there is no concern that the engagement between the engagement portion 7 and the curled portion 103 of the container 101 may be released, and even when an internal pressure of the sealed container 101 increases with a hot beverage or the like contained therein, there is very little likelihood that the lid 1 is released from the container 101.

In general, the larger size the top lid 2 of the lid 1 has, the more the top lid 2 is likely to be twisted when a load is applied to the lid 1. However, as in the lid 1 according to the present invention, by forming the side wall 3 to be inclined in the tapered shape from the upper end side thereof toward the lower end side thereof, joining the rising portion 4 formed to rise in the inclined shape in the opening-widening manner to the inner surface of the upper wall 5 of the side wall 3, and further joining the rising portion 4 and the folded portion 9 together, even if the lid 1 is of a large size, it is less likely that the lid 1 is released from the container 101 when a load is applied to the lid 1. The lid 1 according to the present invention has a larger dimension at a lower joining point 10 of the joint portion between the rising portion 4 of the top lid 2 and the upper wall 5 of the side wall 3 (a diameter at the lower joining point 10 when the top lid 2 has a circular shape) than at the lower end part 8 of the engagement portion 7 (a diameter at the lower end part of the engagement portion 7 when the top lid 2 has a circular shape), so that the closed state can be reliably maintained. In the lid 1 of the present embodiment, the joint portion between the upper wall 5 of the side wall 3 and the rising portion 4 of the top lid 2 is formed upward of the top lid 2 as a protruding wall. In a case where a beverage such as coffee is contained in the container 101, the protruding wall can be used as a month putting portion when drinking the beverage and can be used as a wall preventing the beverage from overflowing.

The container 101 is not limited to the container having a shape in which the side wall 104 is inclined such as a coffee cup or a cup-type noodle container, and may be a cylindrical container such as a nut can and the like. The lid 1 of the present invention can be used for various kinds of container such as a paper container, a plastic container, a foamed plastic container, a metal can and the like, and can also be used as a lid for a container for containing a dried food or the like or for a non-food container or the like, without limitation to a container for containing a liquid material. The lid 1 of the present invention can be used as a lid for a container of soup, yogurt, ice cream, or various kinds of side dishes or meal, as well as the coffee cup, the cup-type noodle container, the nut can, and the like, and can be used as a lid for any kind of container, without limitation to a container for food and beverage.

In the lid 1 of the present embodiment in which the side wall 3 is formed in the inclined shape to be tapered from the upper end side thereof to the lower end side thereof, an inclination angle α of the side wall 3 of the lid 1 may be the same as or different from an inclination angle β, of the side wall 104 of the container 101. In a case where the inclination angles α and β, are different from each other, the inclination angle α of the side wall 3 may be larger or smaller than the inclination angle β, of the side wall 104 of the container 101. However, when the inclination angle α is smaller than the inclination angle β, (when the inclination is large), the fitting force of the lid 1 with respect to the container 101 is higher, thereby further enhancing the sealability. The size of the inclination angle α of the side wall 3 of the lid 1 with respect to the inclination angle β of the side wall 104 of the container 101 can be arbitrarily changed according to a difference in size of the container 101 (the size of the lid 1) or the like in order to enhance the sealability of the lid 1. In a case where the container is non-circular such as a polygonal container, the inclination angle α of the side wall 3 of the lid 1 can be changed according to the difference in shape of a portion of the container onto which the lid 1 is fitted, thereby preventing a change in sealability resulting from the difference in the portion of the container.

In the lid 1 of the above-described embodiment, the upper wall 5 of the side wall 3 and the rising portion 4 of the top lid 2 are formed to have the same height. However, the upper wall 5 of the side wall 3 and the rising portion 4 of the top lid 2 are not limited to the same height, and either one of the upper wall 5 of the side wall 3 and the rising portion 4 of the top lid 2 may be formed to be shorter than the other one.

Examples of the paper-based material constituting the side wall 3 of the lid 1 of the present invention include not only so-called paper, but also chemical fiber paper, synthetic paper, water-resistant paper, coated paper, substitute paper, parchment paper, wool paper, glass fiber paper, stone paper, ceramic paper, and the like, and a plurality of laminated sheets thereof and the like, the paper being produced by stacking spreading fiber raw materials such as crushed pulp, which can be obtained by crushing raw material sheets using a crushing machine, by virtue of an air flow and sticking plant fibers or other fibers such as so-called air-laid sheets obtained by fixing the fibers to each other in the fiber-stacked structure with a binder, the raw material sheets being composed of so-called paper, pulp-based fibers, or the like and obtained by making a slurry from the fiber raw materials on a net, drying or pressure-drying the slurry, and performing papermaking to form sheets. The paper-based material may be composed only of pulp, but may include fibers such as non-pulp-based natural fibers, synthetic fibers, regenerated fibers or the like with pulp preferably in an amount of 50 mass % or more, more preferably in an amount of 70 mass % or more, still more preferably in an amount of 80 mass % or more, and most preferably in an amount of 100 mass %. As the paper-based material, a composite material with a film or a nonwoven fabric of a synthetic resin or a natural resin, a wood-based material such as a wood foil, an aluminum foil, or the like can also be used. When the composite material is used as the paper-based material, the composite material contains pulp preferably in an amount of 50 mass % or more, and particularly preferably in an amount of 80 mass % or more, based on the total mass of the composite material. The higher the pulp content is, the more the paper-based material is likely to be biodegraded, which is preferable.

Examples of the pulp include wood pulp, non-wood pulp, waste paper pulp, synthetic pulp, and the like. More specifically, the examples of the pulp include at least one appropriately selected from: mechanical pulps (MP) such as ground-wood pulps (GP), stone ground pulps (SGP), refiner ground pulps (RGP), pressurized ground-wood pulps (PGW), thermo-mechanical pulps (TMP), chemi-thermo-mechanical pulps (CTMP), and bleached chemi-thermo-mechanical pulps (BCTMP); chemical mechanical pulps (CGP) or semi-chemical pulps (SCP); chemical pulps (CP) such as kraft pulps (KP), e.g. broadleaf bleached kraft pulps (LBKP) and needleleaf bleached kraft pulps (NBKP), soda pulps (AP), sulfite pulps (SP), and dissolved pulps (DP); and auxiliary pulps such as synthetic pulps made from nylon, rayon, polyester, polyvinyl alcohol (PVA), or the like as a raw material, tailings pulps (TP), and stem pulps and bast pulps, e.g. rag pulps, straw pulps, esparto pulps, bagasse pulps, bamboo pulps, and kenaf pulps made from cotton, flax, hemp, jute, manila hemp, ramie, or the like as a raw material. Examples of the pulp that can be used include: needleleaf pulps such as red pine, todo pine, ezo pine, douglas fir, hemlock, and spruce; broadleaf pulps such as beech, oak, kava, *eucalyptus*, poplar, and alder; wood pulps such as a mixture of needleleaf pulp and broadleaf pulp; non-wood pulps such as kenaf, bagasse pulp, bamboo pulp, cereal pulp, walla pulp, abaca pulp, and cotton pulp; and waste paper pulps. The needleleaf pulp has longer fibers than the broadleaf pulp. Accordingly, a paper material using long-fiber pulp such as needleleaf pulp has fibers entangled with each other in a high degree. In addition, crushed pulp obtained by crushing raw material sheets using needleleaf pulp or the like also has longer fibers than that obtained by crushing raw material sheets made of broadleaf pulp, and accordingly, the strength of the paper-based material is enhanced by the fibers entangled with each other.

The paper-based material preferably has water resistance, and a material to which water resistance is imparted in advance, such as water-resistant paper, may be used, or a material in which a coating layer is provided at least on a surface located on a container side of the paper-based material may also be used. The coating layer can be provided by bonding a film or applying a coating agent.

Examples of resin that can be used for forming the coating layer include: polystyrene, polyethylene, polypropylene, polyethylene terephthalate, polyurethane, polyvinyl chloride, polyvinylidene chloride, polyvinyl acetate, cyanoacrylate, an epoxy resin, a polyacrylic acid resin, a polymethacrylic acid resin, nylon, and polycarbonate; natural degradable resins such as polycaprolactone, polyhydroxyalkanoate, polyhydroxybutyrate, polylactic acid, starch-based resins such as esterified starch, cellulose acetate, polyethylene succinate, polyvinyl alcohol, polyglycolic acid, chitosan/cellulose/starch, poly(hydroxybutyrate/hydroxyhexanoate), poly(caprolactone/butylene succinate), polybutylene succinate, poly(butylene succinate/adipate), poly(butylene succinate/carbonate), poly(ethylene terephthalate/succinate), poly(butylene adipate/terephthalate), and poly(tetramethylene adipate/terephthalate), and mixtures of the natural degradable resins; natural degradable biomass resins and mixtures of the natural degradable biomass resins; a fluororesin, a silicone resin, an ultraviolet curing resin, copolymers of monomers constituting the resin, such as an ethylene-vinyl acetate copolymer, an ethylene-vinyl alcohol copolymer, an ethylene-propylene copolymer, an ethylenepropylene-butadiene copolymer, an acryl-styrene copolymer, a styrene-butadiene copolymer, and an acrylonitrile-butadiene-styrene copolymer, a natural resin, paraffin, gelatin, cellophane, polymethylpentene, and the like. The coating layer is preferably formed of a natural degradable resin, such as polylactic acid, polycaprolactone, polyhydroxyalkanoate, or a starch-based resin, a natural degradable biomass resin, or a natural resin.

Examples of the natural degradable resin include natural resins, natural degradable plastics, biomass plastics, and the like. Examples of the natural degradable plastics and the biomass plastics include natural degradable resins such as polycaprolactone, polyhydroxyalkanoate, polyhydroxybutyrate, polylactic acid, starch-based resins such as esterified starch, cellulose acetate, polyethylene succinate, polyvinyl alcohol, polyglycolic acid, chitosan/cellulose/starch, poly(hydroxybutyrate/hydroxyhexanoate), poly(caprolactone/butylene succinate), polybutylene succinate, poly(butylene succinate/adipate), poly(butylene succinate/carbonate), poly(ethylene terephthalate/succinate), poly(butylene adipate/terephthalate), and poly(tetramethylene adipate/terephthalate), and mixtures of the natural degradable resins.

In addition, the naturally degradable resin may contain additives described in the positive list of the Japan Bioplastics Association. Examples of the additives include: lubricants such as stearic acid amide, fatty acid ester, fatty acid metal salt, fatty acid, fat and oil, and glycerin fatty acid ester; stabilizers such as triphenyl phosphate, phthalic anhydride, trisdibutyl phosphate, and acetic anhydride; inorganic materials such as titanium dioxide, kaolin, mica, bentonite, diatomaceous earth, magnesium oxide, silica sand aluminum, calcium carbonate, calcium hydroxide, and seashell powder; surfactants such as higher fatty acid amide, non-ionic surfactant, and glycerin fatty acid ester; foaming agents such as citric acid, sodium bicarbonate, and butane; and other materials such as an antistatic agent and a hot melt adhesive.

In addition, the "naturally degradable" refers to a property capable of degradation by microorganisms, ultraviolet rays, changes in climate, or the like in any of air, soil, and water to reduce an environmental load. In addition, the lid according to the present invention is not limited by the contents of the container to which the lid is attached, and can be applied as a lid that closes a container capable of containing any kind of content.

In the lid 1 of the present invention, the top lid 2 can be made of the same paper-based material as the side wall 3, but can be made of a film or a sheet material other than the paper-based material. When the top lid 2 is made of a film or a sheet material, the top lid 2 has higher flexibility than that made of a paper-based material, thereby making it easier to fit the lid 1 onto the container 101. In addition, if the top lid 2 is made of a transparent film or sheet material, contents in the container 101 can be visually checked easily when the lid 1 is attached to the container 101. Examples of the film or the sheet material that can be used include polyvinyl chloride, polyvinylidene chloride, polyurethane, polyethylene terephthalate (PET), olefin-based resins such as polyethylene and polypropylene, polyvinyl alcohol, acrylic resins such as polyacrylic acid, polymethacrylic acid, and an acrylonitrile-butadiene-styrene copolymer, polyethylene terephthalate, cellophane, nylon, an ethylene-vinyl alcohol copolymer, polymethylpentene, polyvinyl acetate, polylactic acid, polycaprolactone, polyhydroxyalkanoate, a starch-based resin, a composite thereof, and the like. However, polyvinyl acetate, polylactic acid, polycaprolactone, polyhydroxyalkanoate, a starch-based resin, and the like, which are biodegradable, are preferable. Also, a laminate can be used by forming an aluminum layer on paper or the like by vapor deposition or the like, or by providing an aluminum layer on a surface of paper or the like and further providing a laminate layer or a coating layer of polyethylene, polypropylene, or the like on one surface or both surfaces of the aluminum layer. In a case where the top lid 2 is made of a film or a sheet material, when a material which is difficult to heat-seal, such as PET, is used, if polyethylene, polypropylene, or the like (OPP, CPP, or the like) is coated on a surface to be joined to the side wall 3, the top lid 2 and the side wall 3 can be easily joined together by heat sealing.

Figure 3:
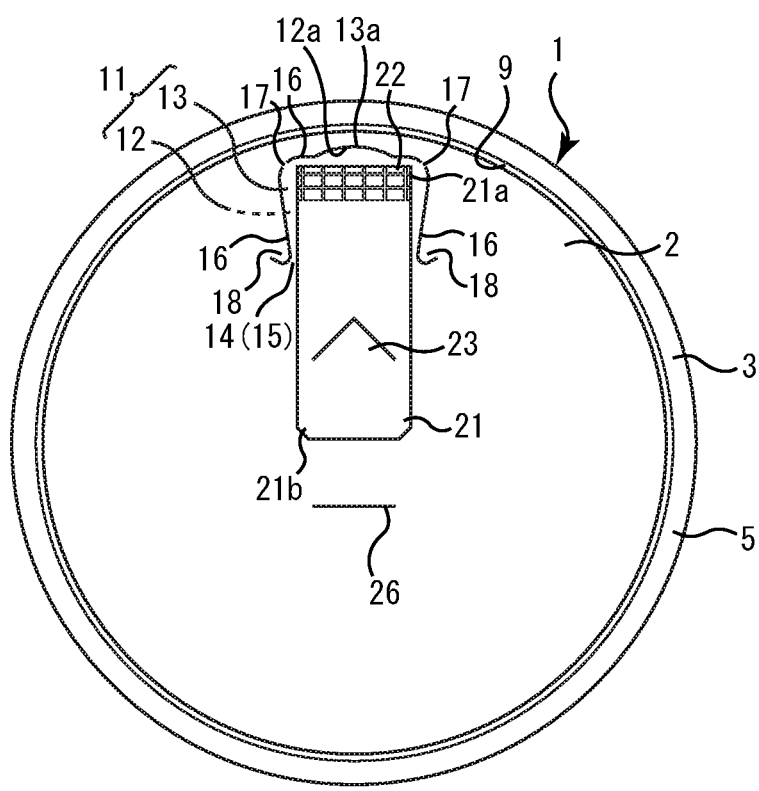
FIG. 3 is a plan view illustrating the lid in a state where the lid piece is closed.

In the lid 1 of the present invention, both in a case where the top lid 2 is made of a paper-based material and in a case where the top lid 2 is made of a film or a sheet material, when the top lid 2 is configured to have a material having a heat sealing property on a side to be brought in contact with the opening portion of the container 101, the top lid 2 may be joined to the opening portion of the container 101 (the curled portion 103 of the container 101 in the aspect illustrated in FIG. 3) by a heat seal, and the lid 1 may be detached from the container 101 while removing the seal at the time of use. In this way, it is possible to shield the contents of the container 101 from outside air until the contents are used. In a case where the top lid 2 is made of a film or a sheet material, it is preferable to use a material having air permeability resistance and moisture permeability resistance to increase the shielding property from outside air.

Figure 14A:
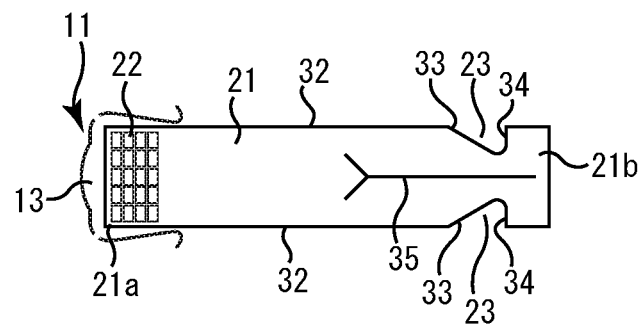
FIG. 14 is an explanatory view and a perspective view illustrating another aspect of the seal member.
Figure 14B:
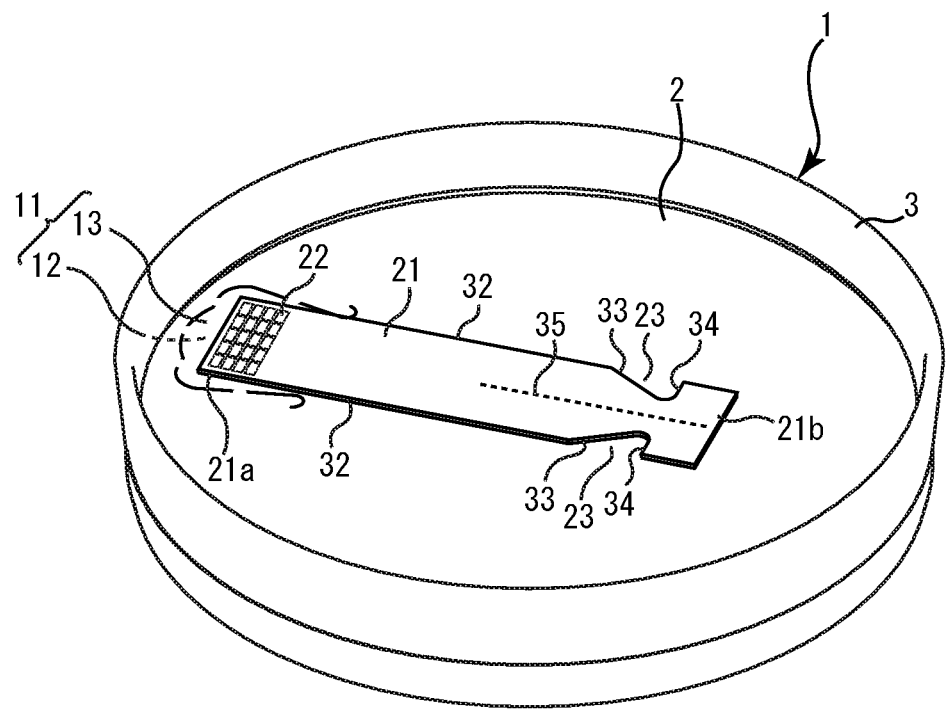

In order to close the container 101 with the lid 1 of the present invention, the engagement portion 7 is first fitted onto the curled portion 103 of the container 101 at one end of the lid 1 as illustrated in FIG. 14A, the engagement portion 7 is then sequentially fitted onto the curled portion 103 toward the opposite side of the lid 1 to warp the top lid 2 as illustrated in FIG. 14B, and the engagement portion 7 is fitted onto the curled portion 103 of the container 101 at the other end of the lid 1, thereby fitting the lid 1 onto the container 101 such that the container 101 can be closed. Since the lid 1 of the present invention has flexibility overall and the lower wall 6 of the side wall 3 has elasticity in a thickness direction, the lid 1 can be fitted onto the container 101 even when the inner dimension of the lower end part of the lower wall 6 is smaller than the outer dimension of the opening portion of the container 101, such that the inner surface of the lower wall and the lower surface of the top lid of the lid 1 are in tight contact with the container opening portion (curled portion 103), thereby reliably closing the container 101 with high sealability. The lid 1 of the present invention can be fitted onto a container opening portion, not limited to a container having a curled portion, to maintain high sealability.

Figure 1:
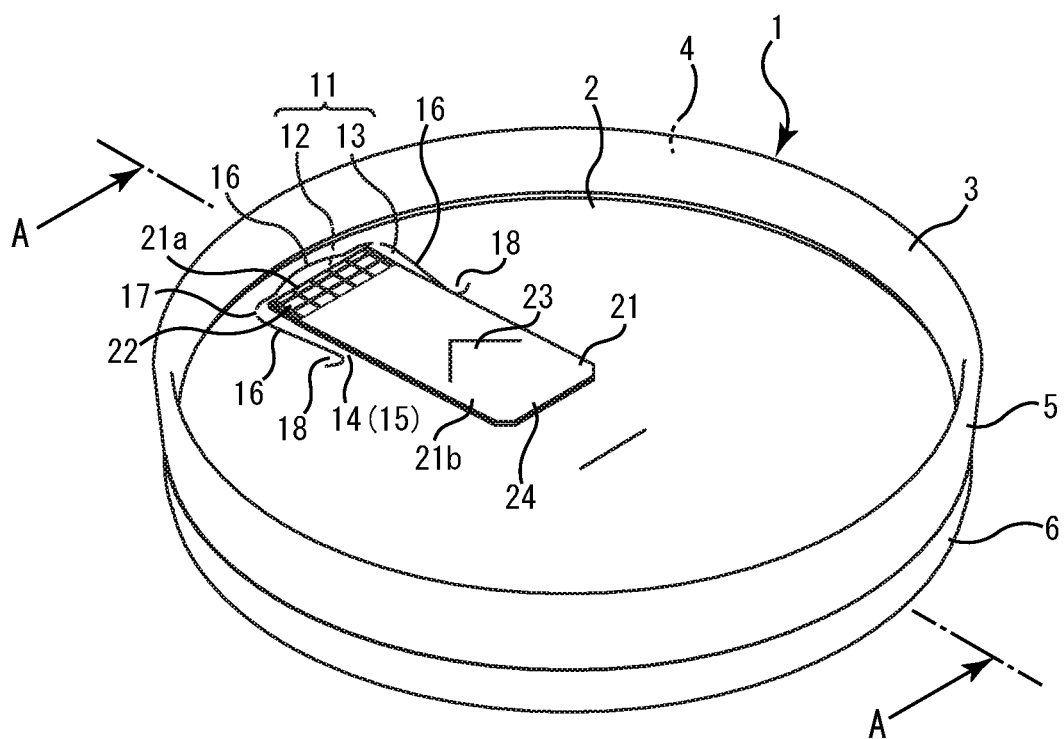
FIG. 1 is an external perspective view illustrating a lid according to an embodiment of the present invention in a state where a lid piece is closed.
Figure 2:
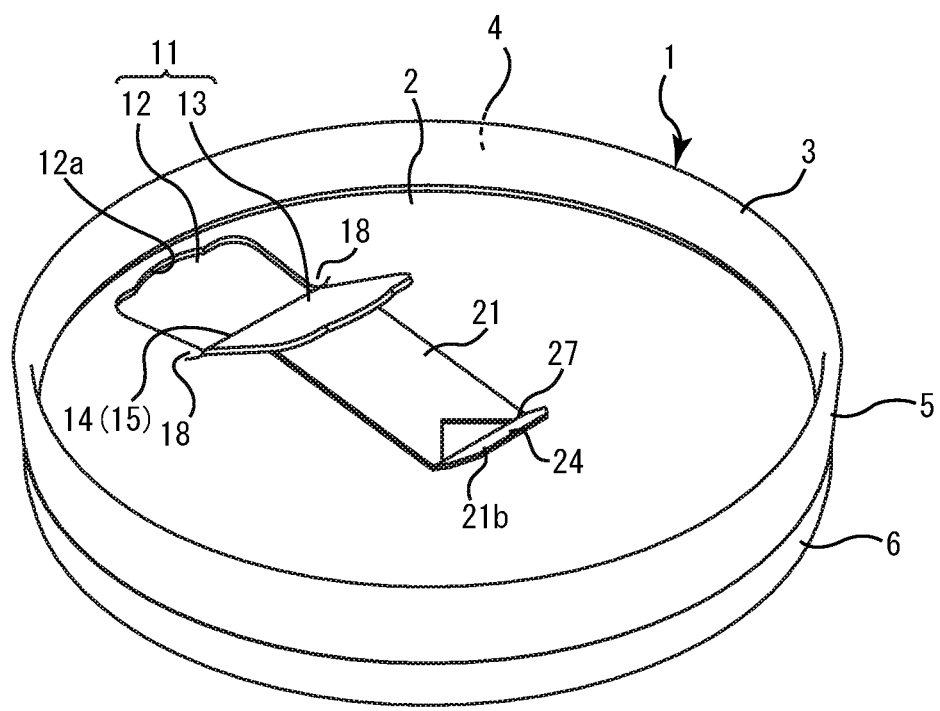
FIG. 2 is an external perspective view illustrating the lid in a state in which the lid piece is opened.
Figure 4:
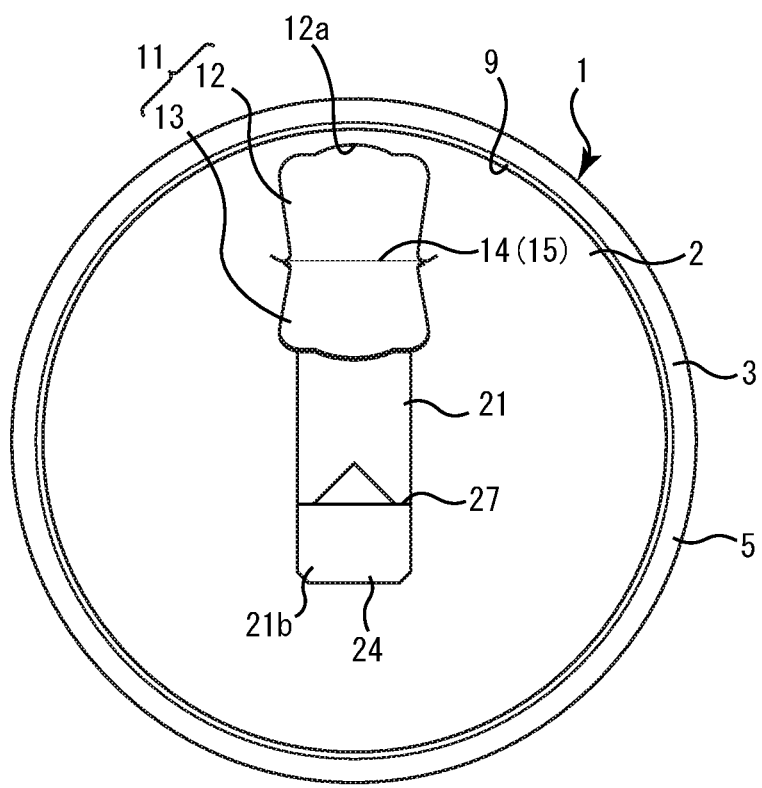
FIG. 4 is a plan view illustrating the lid in a state in which the lid piece is opened.
Figure 5:
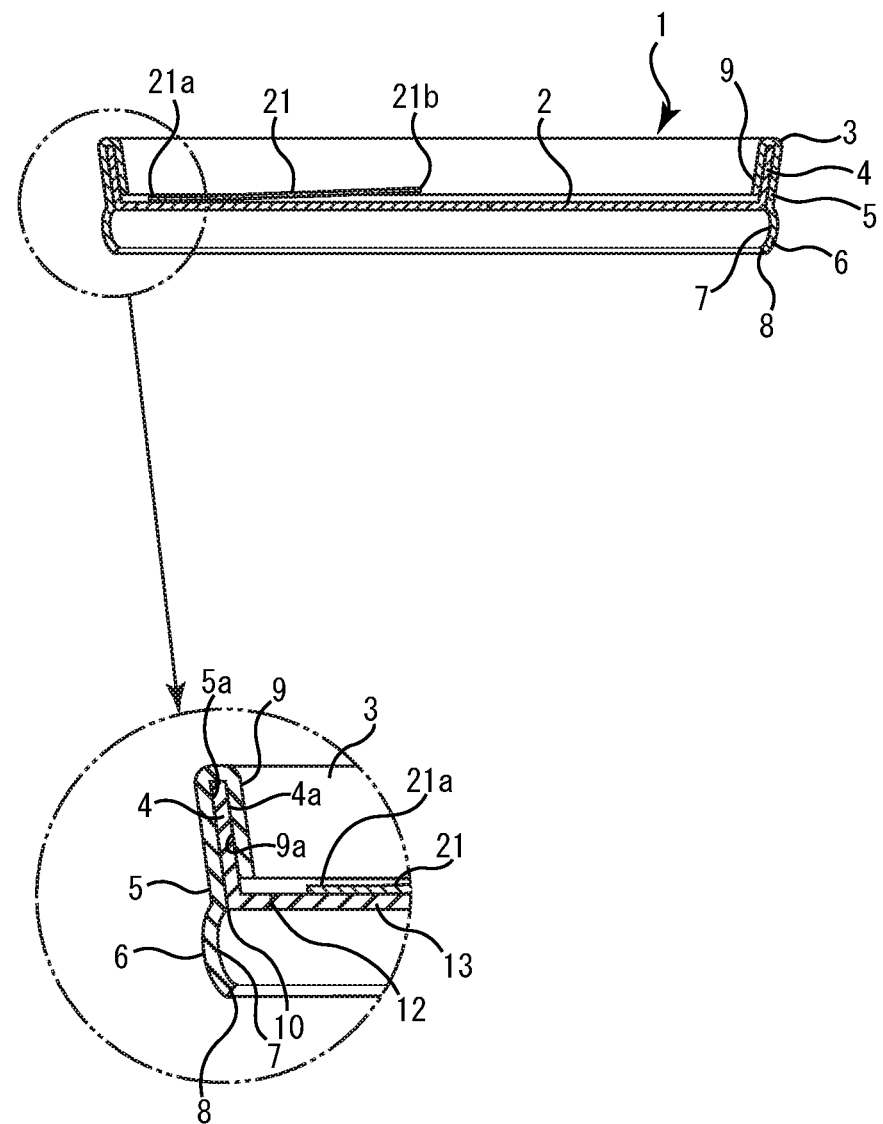
FIG. 5 is a longitudinal sectional view taken along line A-A of the lid in FIG. 1.

Next, a configuration of an opening forming portion 11 and the like in the top lid 2 will be described. As illustrated in FIG. 1, etc., the opening forming portion 11 includes an opening portion 12 and a lid piece 13, and is formed so that the lid piece 13 closes the opening portion 12 as illustrated in FIGS. 1 and 3, and the lid piece 13 is opened and the opening portion 12 is open as illustrated in FIGS. 2 and 4. The opening portion 12 constituting the opening forming portion 11 communicates between the inside and the outside of the top lid 2 and is formed to penetrate between a front surface 2 and a back surface 2b of the top lid 2. For example, the opening portion 12 serves as an opening formed to allow the contents (e.g., beverage or food) in the space portion 105 of the container 101 to enter or exit when the lid 1 is attached to the container 101. As illustrated in FIG. 1, etc., the opening forming portion 11 is provided in the top lid 2 at a position shifted to a predetermined position in an outward direction from the central part of the top lid 2. In addition, the lid piece 13 formed in the top lid 2 is formed such that one end part 13a thereof located at a position away outwardly from the central part of the top lid 2 by a predetermined distance is a free end, and the other end part 13b thereof located closer to the center than the one end part 13a is a fixed end. A hinge portion 14 is formed at the other end part 13b, and the lid piece 13 is formed to be capable of opening or closing through the hinge portion 14. That is, the opening forming portion 11 is configured such that the one end part 13a is operated to open or close the top lid 2 with the hinge portion 14 as a fulcrum at the other end part 13b of the lid piece 13. In addition, the opening forming portion 11 is formed such that the opening portion 12 is open when the lid piece 13 is opened. Concerning the opening/closing operation of the lid piece 13, a bending line 15 is preferably formed in the hinge portion 14. The bending line 15 may be formed on the front surface 2a and/or the back surface 2b of the top lid 2. By forming the bending line 15 on the hinge portion 14 as described above, the opening/closing operation of the lid piece 13 can be easily performed with reference to the bending line 15. Also, since the other end part 13b of the lid piece 13 is bent at a place where the bending line 15 is formed, the other end part 13b of the lid piece 13 can be easily and tidily bent when bent in the hinge portion 14, that is, when the lid piece 13 is opened. In other words, by forming the bending line 15, the lid piece 13 can be prevented from being bent at a place other than the place where the bending line 15 is formed as a fulcrum. The bending line 15 can be formed, for example, by performing pressing in a linear shape through press molding. That is, the bending line 15 can be formed by performing pressing in a linear shape at a predetermined position where the bending line 15 is to be formed using a press molding machine or the like. Since the lid piece 13 is bent only at a specific location where the bending line 15 is formed in this way, it is possible to greatly reduce a variation in position where the lid piece 13 is bent. Note that the bending line 15 can be formed by appropriately selecting and using any conventionally known method.

The opening forming portion 11 is formed such that the space portion 105 of the container 101 can be visually recognized through the opening portion 12 when the lid piece 13 is opened in a state where the lid 1 is attached to the container 101. Note that the opening portion 12 is preferably formed at a position such that, when the lid 1 is attached to the container 101, one end part 12a of the opening portion 12 (an end part on the same side as the one end part of the lid piece 13) is located on a more outward side than an inner wall 106 of the container 101.

As illustrated in FIGS. 1 and 2, while the bending line 15 is formed at a place where the hinge portion 14 is formed, cut lines 16 are formed at a place other than the place where the hinge portion 14 is formed, and a dot-shaped joint portion 17 is formed between a cut line 16 and another cut line 16 to join the opening forming portion 11 to the top lid 2. By forming the opening forming portion 11 as described above, the dot-shaped joint portions 17 exist and the lid piece 13 remains closed before use, but the dot-shaped joint portions 17 are cut and the joint at dot-shaped joint portions 17 is released when the lid piece 13 is pulled by a seal member 21, which will be described later, or pulled up by the seal member 21.

Alternatively, the opening forming portion 11 may be formed by a half cut in which a cuttable line is formed entirely along the shape of the lid piece 13 (in other words, entirely along the shape of the opening portion 12), rather than being formed by the cut lines 16 and the dot-shaped joint portions 17 as described above. In a case where the opening forming portion 11 is formed as a half-cut portion H (see FIG. 18), a half cut is formed entirely along the shape of the lid piece 13 (or the opening portion 12) without the cut lines 16 and the dot-shaped joint portions 17 as described above. In the half-cut portion, the half cut is formed at a depth smaller than an overall thickness of the top lid 2, without penetrating between the front surface 2a and the back surface 2b of the top lid 2 like the cut lines 16. Note that, when the cut lines 16, the dot-shaped joint portions 17, and the half-cut portion H are used, all of the cut lines 16, the dot-shaped joint portions 17, and the half-cut portion H may be used in the lid 1, except the case where the half-cut portion H is formed in place of the cut lines 16 and the dot-shaped joint portions 17.

As illustrated in FIG. 1, etc., stress relieving portions 18 are formed with the lid piece 13 to relieve stress generated against a force applied to the other end part 13b where the hinge portion 14 is formed when the lid piece 13 is pulled up. In the example illustrated in FIG. 1, etc., the stress relieving portions 18 are formed to be each curved in a direction in which a distance between the respective cut lines 16 increases toward a direction opposite to a direction in which the lid piece 13 is formed at a place where the hinge portion 14 is formed. The stress relieving portion 18 is formed such that the other end part of the cut line 16 is located at a position shifted from a radial-direction position where the hinge portion 14 is formed, that is, a position on a more outward side in the radial direction than the radial-direction position. Since the stress relieving portion 18 is formed by locating the other end part of the cut line 16 as described above, the cut line 16 is formed at a position adjacent to the hinge portion 14, thereby reducing stress applied to the position. As described above, in order to reduce the stress generated at the position, it is required that the other end part of the cut line 16 be located at a place different from the place where the hinge portion 14 is formed, rather than locating the other end part of the cut line at the same place as the hinge portion 14. By forming the stress relieving portions 18 as described above, it is possible to reduce the stress applied to the other end part of the cut line 16 at the time of opening the lid piece 13, and it is also possible to solve a problem such as occurrence of breakage or damage to the top lid 2 at a moment the lid piece 13 is opened.

Figure 6A:
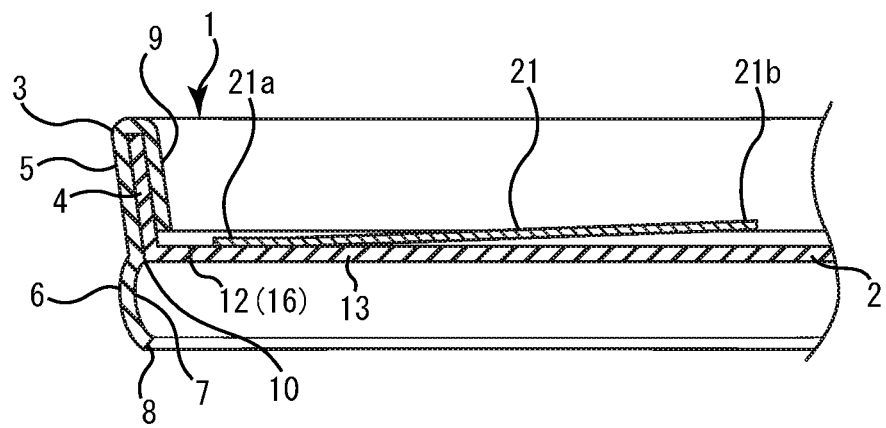
FIG. 6 is a partially enlarged cross-sectional view of the lid.
Figure 6B:
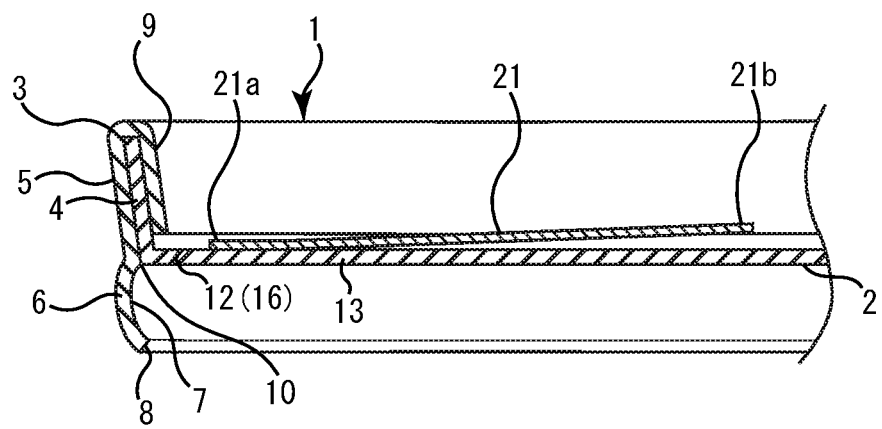

Note that, concerning the cut line 16, a cut may be formed perpendicularly from the front surface 2a to the back surface 2b of the top lid 2 as illustrated in FIG. 6(a), or a cut may be formed to have a predetermined angle from the front surface 2a toward the back surface 2b of the top lid 2 as illustrated in FIG. 6(b). When the cut is formed perpendicularly from the front surface 2a toward the back surface 2b of the top lid 2 as illustrated in FIG. 6(a), the lid piece 13 can be relatively easily opened along the cut line 16. In addition, when the cut line 16 is formed by cutting as illustrated in FIG. 6(b), a slope-shaped cut surface formed on the top lid 2 side and a slope-shaped cut surface formed on the lid piece 13 side abut on each other. Therefore, when it is tried to pull up the lid piece 13 or when the container 101 has been closed with the lid 1, even if the top lid 2 is pressed from the back surface 2b side toward the front surface 2a side due to a change in vapor pressure in the space portion 105 or the like, the lid piece 13 is difficult to open because the cut surface on the lid piece 13 side and the cut surface on the top lid 2 side abut on each other. Therefore, by forming the lid piece in this way, it is possible to more effectively prevent the lid piece 13 from being unexpectedly opened. Note that, when the slope-shaped cut surfaces are formed on the top lid 2 side and the lid piece 13 side, respectively, as illustrated in FIG. 6(b), the cut surface on the top lid 2 side is preferably a slope surface in which one end of the cut surface on the front surface side is closer to the center than the other end of the cut surface on the back surface 2b side. In addition, the cut surface on the lid piece 13 side is preferably formed such that one end of the cut surface on the back surface 2b side is on a more outward side in the radial direction than the other end of the cut surface on the front surface 2a side.

The opening forming portion 11 can be formed by arbitrarily selecting a so-called punching method or a conventionally known method corresponding to the "punching". In addition, in order to form the opening forming portion 11 by the above-described punching, a punching blade used when performing punching preferably has a thickness of 1.0 mm or less. More specifically, the thickness of the punching blade is more preferably 0.7 mm or less, and still more preferably 0.4 mm or less. When the thickness of the punching blade is 0.4 mm or less, while the cut line 16 is formed, a gap is less likely to be formed resulting from the cut line 16 due to the characteristics of the paper material after being cut. Therefore, it is possible to greatly reduce leakage from the cut line 16.

In a case where the lid 1 is used for a container for containing a beverage, for example, as in the present embodiment, the opening portion 12 is an opening formed to function as a drinking port through which the beverage in the container 101 can flow out to the outside of the container 101 when a user drinks the beverage in the container 101. Furthermore, the opening portion 12 may function as an insertion port through which an object such as a straw can be inserted into the space portion 105 of the container 101.

As illustrated in FIG. 1, etc., the seal member 21 is attached to the lid piece 13. A joint portion 22 is formed at one end part 21a of the seal member 21. The joint portion 22 is formed to join the seal member 21 to the lid piece 13 by various methods such as ultrasonic joint, heat sealing, and adhesive-used joint. As a joint method in the joint portion 22, the ultrasonic joint is preferable among the above-described methods in light of ease of joint, strength of joint, and the like. The one end part 21a of the seal member 21 is attached to the lid piece 13 at a position shifted from the central part of the lid piece 13, preferably at a position far away from the central part of the top lid 2 on the lid piece 13, and more preferably at a position farthest away from the central part of the top lid 2. That is, the seal member 21 is attached to the lid piece 13 at a position close to the one end part 13a. In other words, the seal member 21 is joined to one end of the top lid 2 on the lid piece 13. In particular, the joint portion 22, where the lid piece 13 and the seal member 21 are joined together, is preferably formed on the one end part 13a side of the lid piece 13 away from the hinge portion 14.

When the seal member 21 is joined to the lid piece 13 at a position far away from the hinge portion 14 as described above, a distance to the point of force with respect to the hinge portion 14 (fulcrum) can be increased. As a result, when the seal member 21 is lifted up or the like, force is applied to the lid piece 13 via the seal member 21, and the joint in the dot-shaped joint portion 17 or in the half-cut portion is released, thereby making it easier to open or close the lid piece 13.

Figure 18:
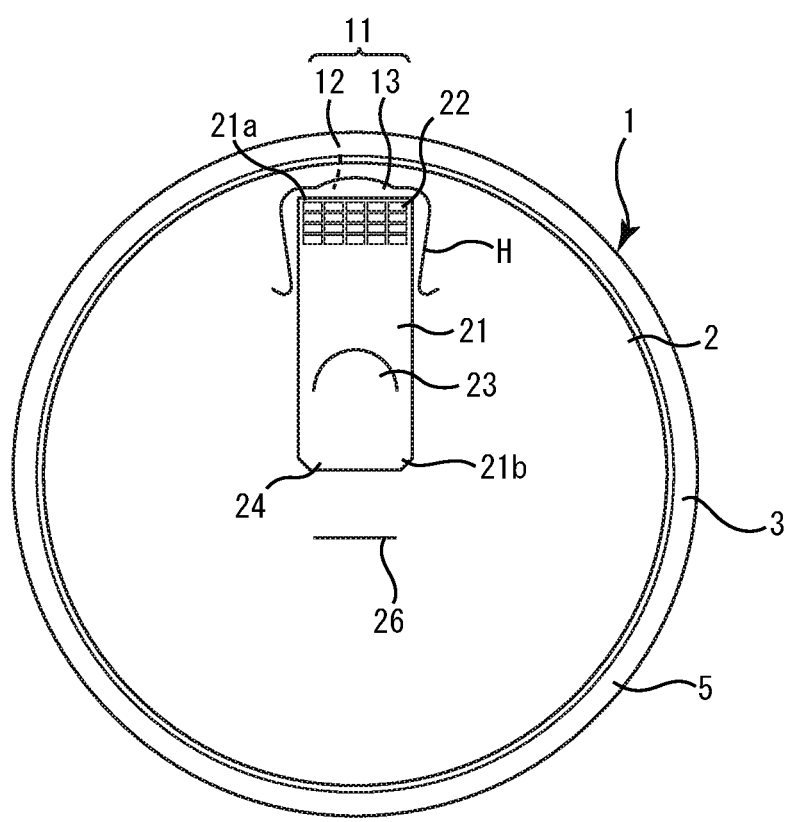
FIG. 18 is a plan view illustrating another aspect of the seal member.
Figure 19:
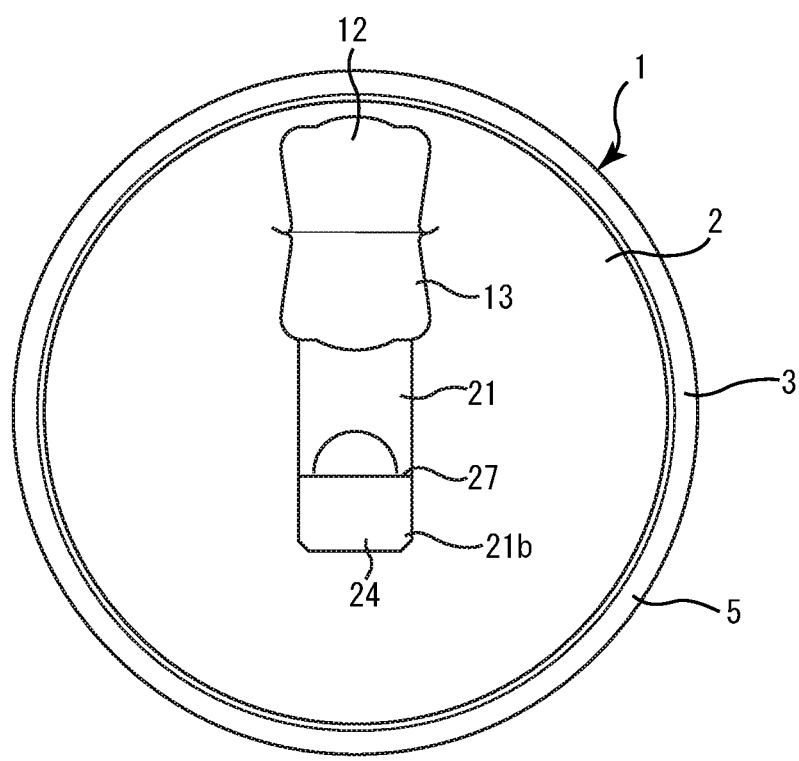
FIG. 19 is a plan view illustrating a state in which the lid piece is opened using the seal member illustrated in FIG. 18.

The seal member 21 has one end part 21a attached to the lid piece 13 and the other end part 21b opposite to the one end part 21a. At the other end part 21b of the seal member 21, a holding portion 23 is formed in a claw shape by making a cut line in the seal member 21. The holding portion 23 is formed at a position close to the other end part 21b in the seal member 21 within a predetermined range. In a state illustrated in FIGS. 1 and 3, the holding portion 23 is in a state where the cut line is formed in the seal member 21. However, when the holding portion 23 is held by a holding reception portion 26 formed in the top lid 2, that is, when the holding portion 23 formed in the claw shape is inserted into a cut line formed as the holding reception portion 26 in the present embodiment, the holding portion 23 protrudes from the seal member 21 toward the front surface 2a of the top lid 2 in the claw shape. In the present embodiment, as illustrated in FIG. 1, the holding portion 23 is formed in a triangular shape with a pointed tip. However, the shape of the holding portion 23 is not limited to the triangular shape. For example, as illustrated in FIGS. 18 and 19, the holding portion 23 may be formed in a semicircular shape, and the claw-like holding portion 23 formed in the semicircular shape may be inserted into the holding reception portion 26 to hold the holding portion 23. In addition, the shape of the holding portion 23 is not limited to these shapes, and may be another shape as long as the holding portion 23 is formed to be held by the holding reception portion 26. Note that, in FIGS. 2 and 4, etc., reference sign 27 denotes a fold line formed when the holding portion 23 is formed to protrude toward the top lid 2 by pinching a knob portion 24 of the seal member 21. Note that the other end part 23b may be joined to the top lid 2 using the above-described adhesive or the like if necessary. Accordingly, the seal member 21 can be prevented from being damaged before use.

Note that the seal member 21 can be formed by appropriately selecting and using the same material as the top lid 2 and the side wall 3, e.g. the above-described paper-based material or another one of the above-described materials. Alternatively, as a material capable of forming the seal member 21, for example, a wood piece, a film-like member, a metal member, or the like can be used. However, when these members are used, it is necessary that the holding portion 23 can be formed and the holding portion 23 can maintain a state being held by the holding reception portion 26. That is, any material may be appropriately selected and used as long as the seal member 21 is formed such that the user can pull up the lid piece 13 by operating the knob portion 24 while pinching the knob portion 24, and furthermore, the holding portion 23 can be held by the holding reception portion 26 and the opening portion 12 can be maintained in an opened state while the holding portion 23 is held by the holding reception portion.

Figure 7A:
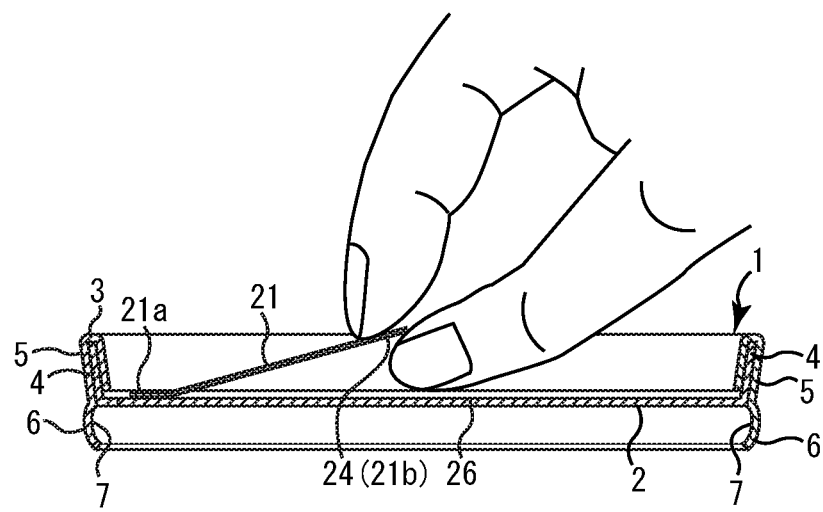
FIG. 7 is an explanatory view for describing a function and an effect when the lid piece of the lid is opened.
Figure 7B:
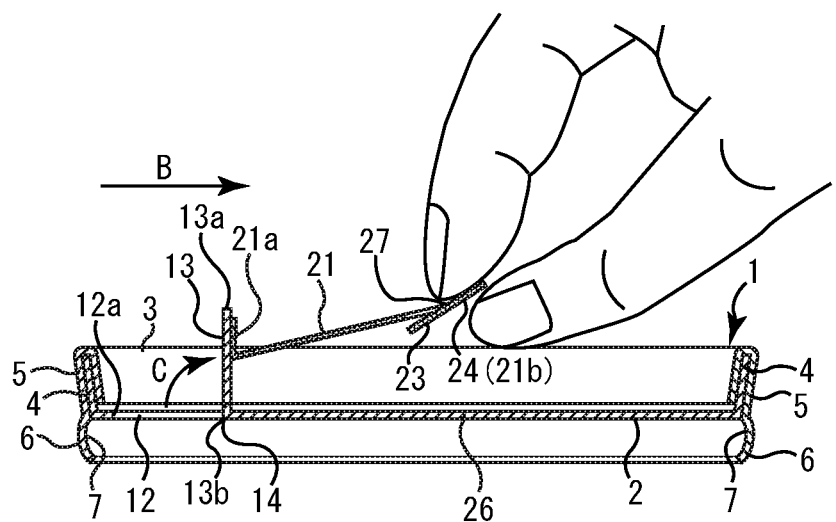
Figure 7C:
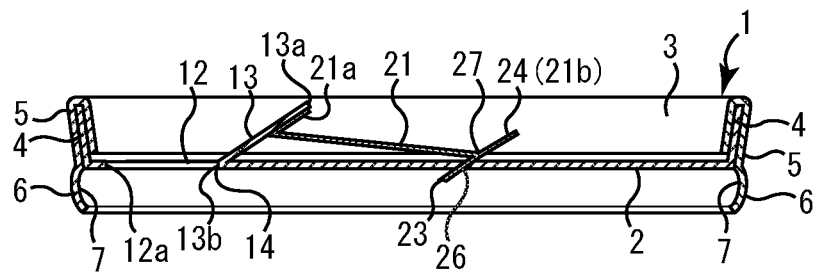

Next, functions and effects of the opening forming portion 11 in the lid 1 according to the present invention will be described. First, as illustrated in FIG. 7(a), the user pinches the knob portion 24 of the seal member 21 and lifts the other end part 21b of the seal member 21 in the lid 1. At this time, in a case where the other end part 21 is joined to the top lid 2 as described above, the user releases the joint by peeling off the seal member 21 from the front surface 2a of the top lid 2 at the time of picking up the other end part 21b of the seal member 21, and lifts up the knob portion 24 in the picked-up state at the other end part 21b of the seal member 21. Next, as illustrated in FIG. 7(b), when the user pulls the seal member 21 in direction B while pinching the knob portion 24, the lid piece 13 joined to the one end part 21a of the seal member 21 by the joint portion 22 is lifted up in direction C of the drawing with respect to the hinge portion 14. At this time, since the seal member 21 is joined at a position close to the one end part 13a of the lid piece 13, assuming that the hinge portion 14 is a fulcrum and the joint portion 22 is a point of force, the joint portion 22 makes it easy to cause a lifting force in the direction C when a force is applied by the user in the direction B. At this time, if the bending line 15 is formed at a place where the hinge portion 14 is formed, the lid piece 13 is more easily lifted up in the direction C. When the user further pulls the seal member 21 in the direction B, the lid piece 13 continues to rotate in the direction C about the other end part 13b, and the opening portion 12 is opened. At this time, the user may form the holding portion 23 by bending the other end part 21b of the seal member 21 while pinching the knob portion 24 so that the holding portion 23 protrudes toward the front surface 2a of the top lid 2, or by bending the other end part 21b of the seal member 21 immediately before the holding portion 23 is inserted into the holding reception portion 26 to hold the holding portion 23 without bending the other end part 21b until reaching the vicinity of the holding reception portion 26. Next, as illustrated in FIG. 7(c), the user inserts the holding portion 23 into the holding reception portion 26. By inserting the holding portion 23 into the holding reception portion 26 as described above, the position of the seal member 21 and the opened position of the lid piece 13 are physically fixed. That is, for example, if it is attempted to maintain the lid piece 13 in an opened state using a seal having adhesiveness, particularly when the contents are beverage or hot, it is highly likely that steam or the beverage adheres to the back surface of the lid piece 13. Although sealing is performed, it is peeled off immediately in many cases. Therefore, although the lid piece 13 is stopped by the seal having adhesiveness, the adhesive force gradually decreases over time, causing a phenomenon in which a portion of the lid piece 13 is peeled off and the lid piece 13 tries to return to the original position where the opening portion 12 is closed. If such an operation of the lid piece 13 occurs, for example, when the user's face is close to the front surface 2a of the top lid 2 to drink the beverage, the lid piece 13 touches the user's nose or face, giving discomfort to the user. In contrast, in the lid 1 according to the present invention, the holding portion 23 is held by the holding reception portion 26 to physically fix the seal member 21, thereby reliably suppressing the operation in which the lid piece 13 tries to return to the original position over time and continuously keeping the opening portion 12 in the opened state. Therefore, even when the user tries to put the contents from the space portion 105 of the container 101 into a mouth, the lid piece 13 can be comfortably used without touching the face.

According to the lid 1 of the present invention, since the user operates the holding portion 23 to pull up the lid piece 13, the user can operate the lid piece 13 to open the opening portion 12 or close the opening portion 12 without touching the back surface of the lid piece 13. Therefore, the user's finger does not touch the contents attached to, for example, the back surface of the lid piece 13, which is hygienic, and also, the user can perform a comfortable operation at the time of opening the opening portion 12.

Furthermore, according to the lid of the present invention, the lid piece can also be operated in an opening portion closing direction by operating the holding portion that is being held by the holding reception portion. Therefore, the lid piece opening/closing operation can be performed multiple times in a simple way by operating the holding portion, and thus, the lid piece can be closed in a simple way even when the contents in the container, e.g., a beverage are not completely drunk in a short time, and the closed state can be continuously maintained. In addition, since the lid 1 according to the present invention is formed using a paper-based material, it is possible to provide a lid capable of considering environmental problems.

Figure 11A:
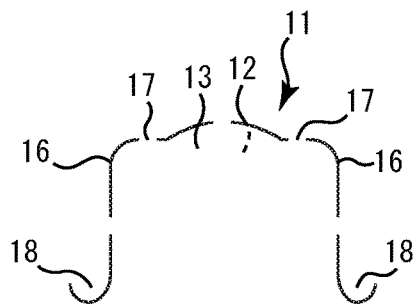
FIG. 11 is an explanatory view for describing another aspect of a drinking opening forming portion.
Figure 11E:
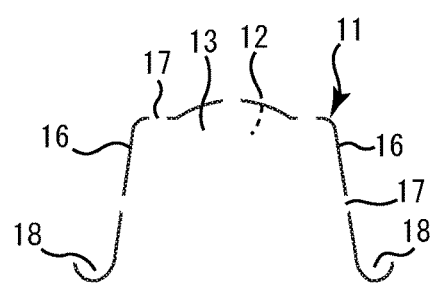
Figure 11B:
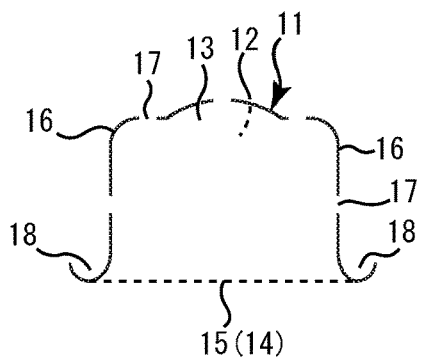
Figure 11F:
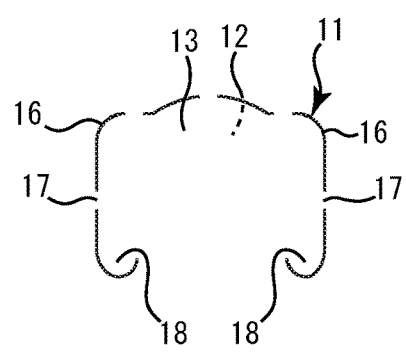
Figure 11C:
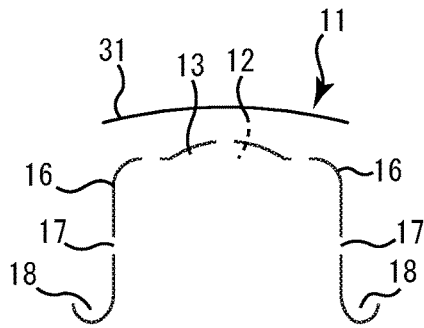
Figure 11D:
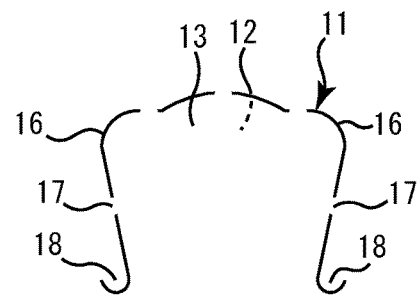

FIGS. 11(a) to 11(f) illustrate examples of the opening forming portion 11. Note that the aspect of FIG. 11(d) is the above-described example of the opening forming portion 11 formed in the lid 1, but is also described here. Specifically, the opening forming portion 11 has the same shape as the lid piece 13. Thus, when the lid piece 13 is opened, the opening portion 12 also has the same shape as the opened lid piece 13. Here, the shape of the opening forming portion 11 will be described based on the lid piece 13 and the opening portion 12 included therein. First, the shape of the opening forming portion 11 is not limited to the above-described shape, and may be an arbitrarily selected shape, for example, as illustrated in modifications, which will be described later. For example, in an opening forming portion 11 illustrated in FIG. 11(a), dot-shaped joint portions 17 are formed at a total of three places: one on one end part side of the opening forming portion 11 which is one end part 13a side; and the others on the left and right sides, respectively, in the middle between the one end part side and the other end part side which is the other end part 13b side. In addition, cut lines 16 forming the opening forming portion 11 are formed on the other end part side which is the other end part 13b side in such a manner as to draw an arc from the other end part side toward the one end part side. In the present modification, stress relieving portions 18 are formed on the other end part 13b side of the cut lines 16. The stress relieving portions 18 are formed in an arc shape, and an end part of the cut line 16 on the other end part 13b side is positioned to be higher than an end part of the opening forming portion 11 on the other end part 13b side. Further, the stress relieving portions 18 are formed to be located on a more outward side than the opening forming portion 11. By forming the stress relieving portions 18 as described above, the top lid 2 can be prevented from being damaged or the like by a force applied to the lid piece 13 or the like when the lid piece 13 is shifted to open the opening portion 12.

An opening forming portion 11 illustrated in FIG. 11(b) has the same shape as that of FIG. 11(a) described above. In the opening forming portion 11 illustrated in FIG. 11(b), a bending line 15 is formed on a proximal end part side in addition to the cut lines 16. Further, it is illustrated in FIG. 11(c) that a bending line 31 is formed on a distal end part side of the lid piece 13 in addition to the cut lines 16. The bending line 15 and the bending line 31 formed as described above serve to specify a position where the end part of the lid piece 13 as the opening forming portion 11 on the other end part 13b side is bent when the lid piece 13, which is the opening forming portion 11, is shifted from a lying state (that is, a state where the opening portion 12 is closed) to a rising state (that is, a state where the opening portion 12 is opened). By forming the bending line 15 on the proximal end part side of the opening forming portion 11 as described above, it is possible to effectively suppress variations in the rising manner, the rising state, and the like when the lid piece 13 as the opening forming portion 11 is shifted to the rising state. Furthermore, by forming the bending line 31 at the end part of the opening forming portion 11 on the one end part 13a side, it is possible to specify a place where the top lid 2, in which the opening forming portion 11 is formed, is bent. Therefore, when the opening forming portion 11 is shifted from the lying state to the rising state, it is possible to reduce an influence on the end part of the opening forming portion 11 on the one end part 13a side.

The opening forming portion 11 illustrated in FIG. 11(d) is different in shape from that of FIG. 11(a) in that a width dimension on the one end part 13a side is larger than that on the other end part 13b side. By forming the opening forming portion 11 as described above, not only the above-described effects can be obtained, but also, for example, in a case where the contents in the container 101 include solids such as ice, it is possible to reliably prevent the solids such as ice from jumping into the user's mouth from the opening forming portion 11 of the present example when the user is using the container 101.

An opening forming portion 11 illustrated in FIG. 11(e) has a width dimension opposite to the shape of FIG. 11(d). That is, there is a difference in that the opening forming portion 11 has a larger width dimension on the other end part 13b side than on the one end part 13a side. By forming the opening forming portion 11 as described above, not only the above-described effects can be obtained, but also, for example, in a case where the contents in the container 101 include solids such as ice, it is possible to reliably prevent the solids such as ice from jumping into the user's mouth from the opening forming portion 11 of the present example when the user is using the solids.

An opening forming portion 11 illustrated in FIG. 11(f) is in an aspect in which the stress relieving portions 18 are formed to be directed inwardly. Although the stress relieving portions 18 are directed inwardly in this way, since the end parts of the cut lines 16 are located at different positions from the hinge portion 14, the top lid 2 can be prevented from being damaged or the like in the same manner as described above.

Note that the dot-shaped joint portion 17 is preferably formed at least at the most distal portion of one end part which is the end part on the one end part 13a side. In general, a user's force is applied to the opening forming portion 11 via the seal member 21. Unless the dot-shaped joint portions 17 are formed at the above-described places, it is possible to greatly reduce a possibility that the opening forming portion 11 is lifted up when the user's force is applied and the contents in the container 101 leaks out of the opening portion 12. Note that, in the aspect illustrated in FIGS. 7(a) to 7(c) as well, the lid piece 13 as the opening forming portion 11 may be formed either by forming the cut lines 16 or by forming the half-cut portion H. In addition, the lid piece 13 as the opening forming portion 11 may be formed in an aspect other than the above-described aspects.

FIGS. 12 to 23 illustrate aspects of the seal member 21.

Figure 12A:
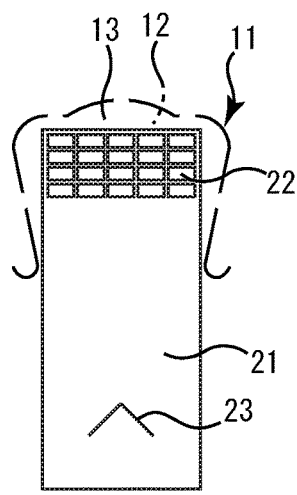
FIG. 12 is an explanatory view for describing another aspect of a seal member connected to the lid piece.
Figure 12D:
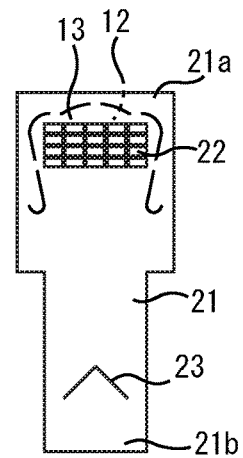
Figure 12B:
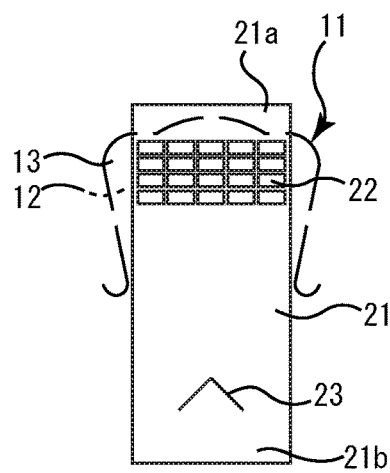
Figure 12E:
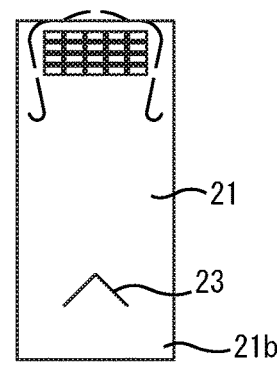
Figure 12C:
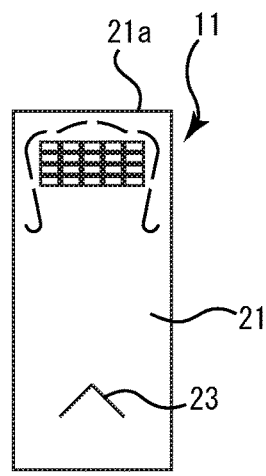

FIG. 12(a) illustrates the above-described example of the seal member 21, and FIG. 12(b) illustrates an example in which a seal member 21 is joined to the lid piece 13 as the opening forming portion 11 in the joint portion 22 and further extends to the distal end side beyond the joint portion 22. In addition, FIG. 12(c) illustrates an example in which a seal member 21 is joined to entirely cover the opening forming portion 11. For example, when the lid piece 13 as the opening forming portion 11 is entirely covered with the seal member 21 as illustrated in FIG. 12(c), it is also possible to prevent a beverage or the like as the contents from leaking out to the front surface of the top lid 2 through gaps such as the cut lines 16 forming the periphery of the lid piece 13. That is, the above-described gaps can be covered by the seal member 21. As a result, even in a situation where the container 101 with the lid 1 attached thereto is relatively likely to shake or even in a situation where the container 101 with the lid 1 attached thereto is likely to tilt, for example, during delivery or take-out, the seal member 21 is capable of preventing the beverage as the contents expected to leak to the outside of the top lid 2 from leaking to the outside. Therefore, it is possible to provide the lid 1 causing no leakage.

FIG. 12(d) illustrates an example in which a seal member 21 is formed to cover the opening forming portion 11, with the above-described knob portion formed to be thin at the other end part. By doing so, the leakage of the content, e.g., a beverage, can be further prevented, and also, the other end part 21b can be easily held and operated by the user. Further, FIG. 12(e) illustrates an example in which a distal end part of a seal member 21 is flush with a distal end part of the opening forming portion 11. Even in this case, the function as the seal member 21 can be effectively exhibited.

Figure 13A:
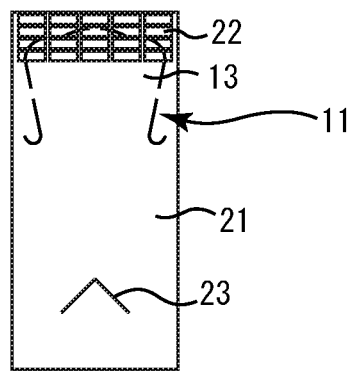
FIG. 13 is an explanatory view for explaining another aspect of the seal member connected to the lid piece.
Figure 13B:
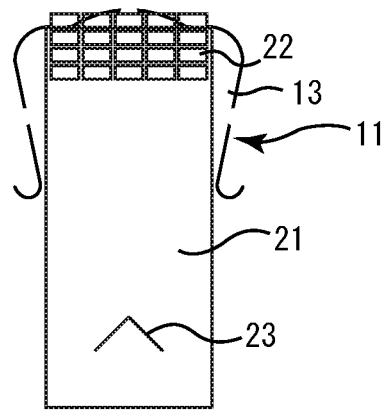

In addition, in an example illustrated in FIG. 13, a seal member 21 entirely covers the opening forming portion 11, and the joint portion 22 at the one end part 21a of the seal member 21 is formed at a position beyond the one end part 13a of the lid piece 13. When the joint portion 22 is formed at such a position, the joint portion 22 can not only join the lid piece 13 and the seal member 21 but also join the front surface 2a of the top lid 2 and the seal member 21. Therefore, in a state before the user operates the seal member 21 (for example, when the lid 1 is in an unused state), the sealed state of the opening forming portion 11 can be further strengthened. The same applies to the aspect illustrated in FIG. 13(b). By joining a seal member 21 to both the lid piece 13 and the top lid 2, the sealed state and the sealing property of the opening forming portion 11 can be improved.

Figure 15:
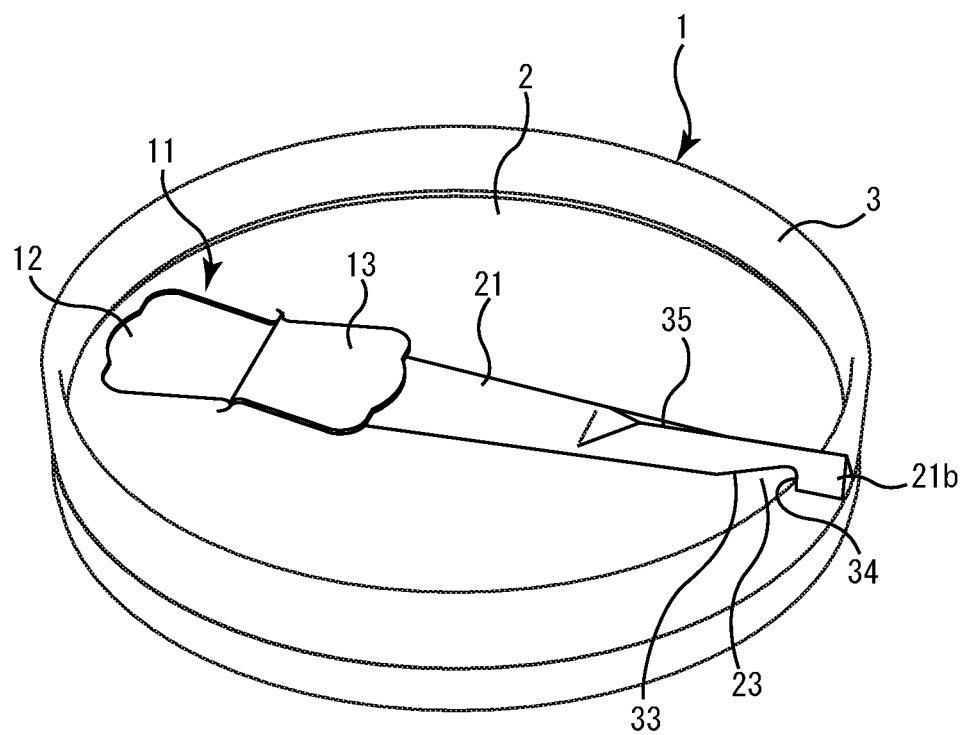
FIG. 15 is a perspective view illustrating a state in which the lid piece is opened using the seal member illustrated in FIG. 14.

FIGS. 14(a) and 14(b) illustrate another form of seal member 21. This seal member 21 is different in the shape of the holding portion 23 from the seal members 21 exemplified so far. That is, in a state illustrated in FIG. 14(a), the holding portion 23 of the seal member 21 has recesses 33 formed to have a narrow width on long sides 32 of the seal member 21. End parts of the recesses on the other end part 21b side are formed as catching portions 34. The seal member 21 has a fold line 35 formed to be bendable toward the other end part 21b in a width direction. In the seal member 21 formed in this manner, when the fold line 35 is mountain-folded as illustrated in FIG. 15, the two recesses 33 formed in the long sides 32 become holding portions 23. Then, in a state where the lid piece 13 is pulled up to open the opening portion 12, the recesses 33 at the holding portions 23 of the seal member 21 is fitted on an upper end part of the side wall 3, and the catching portion 34 is engaged with the outer wall side of the side wall 3 to hold the lid piece 13. At this time, the side wall 3 serves as a holding reception portion 26. That is, the holding reception portion 26 may be formed either in the top lid 2 or in the side wall 3, or the side wall 3 itself may function as the holding reception portion 26.

Figure 16:
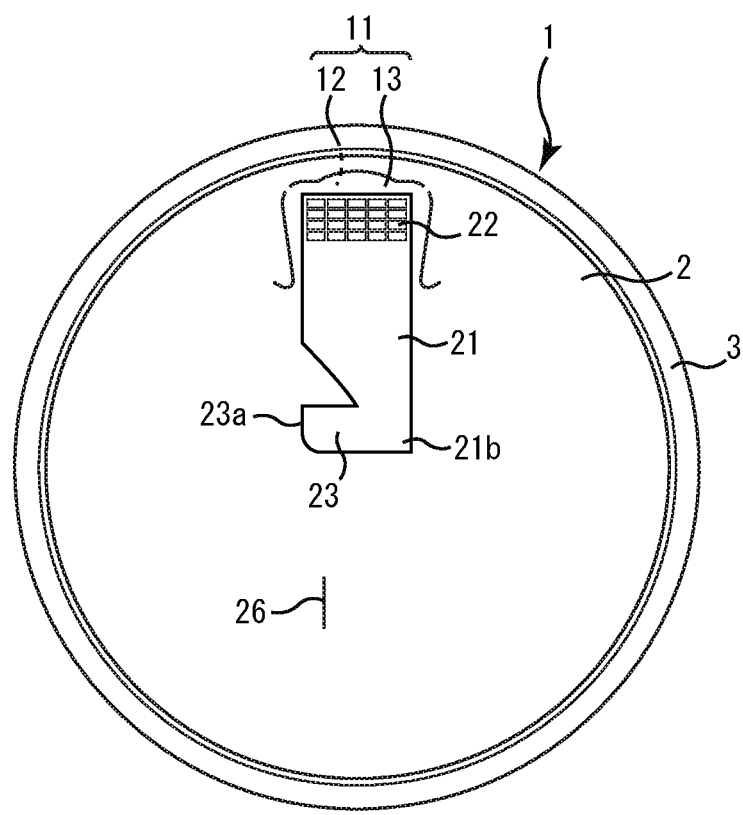
FIG. 16 is a plan view illustrating another aspect of the seal member.
Figure 17:
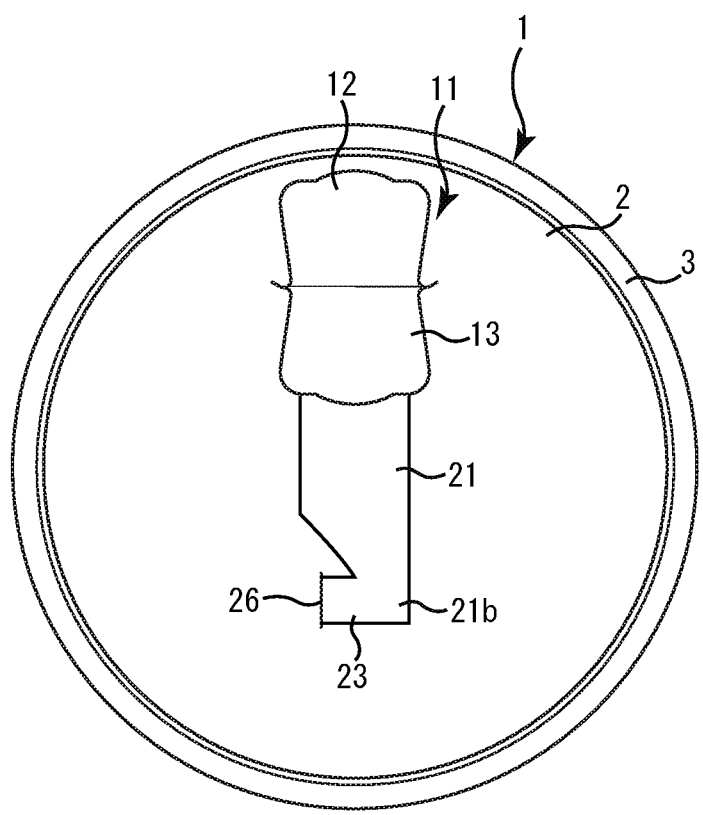
FIG. 17 is a plan view illustrating a state in which the lid piece is opened using the seal member illustrated in FIG. 16.

FIGS. 16 and 17 illustrate another example of seal member 21. In this seal member 21, a holding portion 23 protrudes in the left direction of the drawing in a key shape. A holding reception portion 26 is formed at a position where a distal end part 23a of the holding portion 23 can be inserted thereinto to receive the holding portion 23 formed in the key shape. By inserting the distal end part 23 into the holding reception portion 26, the holding portion 23 formed as described above can maintain a state in which the lid piece 13 is opened, and eventually, a state in which the opening portion 12 is opened.

Figure 20:
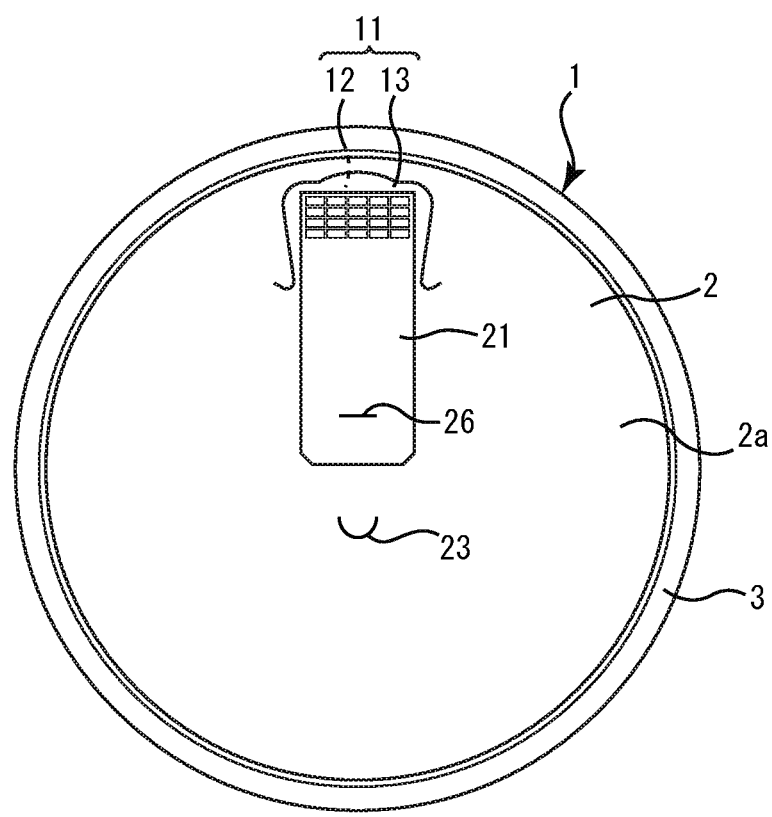
FIG. 20 is a plan view illustrating another aspect of the seal member.
Figure 21:
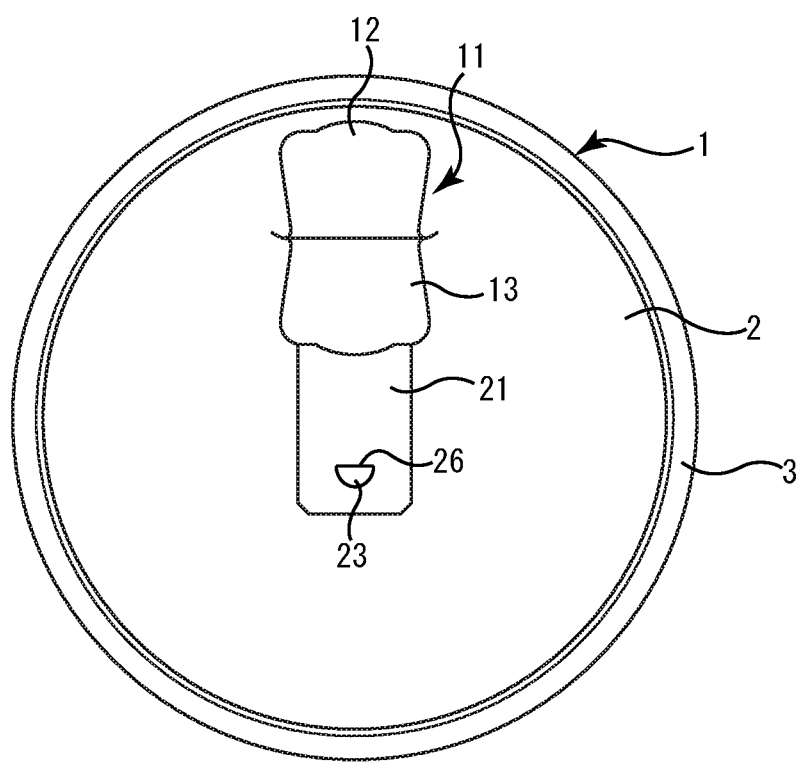
FIG. 21 is a plan view illustrating a state in which the lid piece is opened using the seal member illustrated in FIG. 20.
Figure 22A:
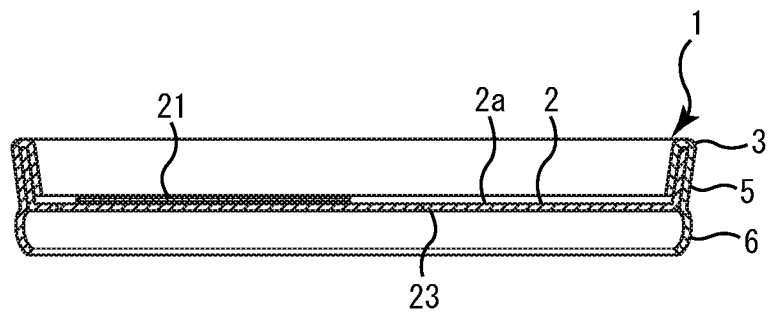
FIG. 22 is an explanatory view for describing a function and an effect when the lid piece is opened using the seal member illustrated in FIGS. 20 and 21.
Figure 22B:
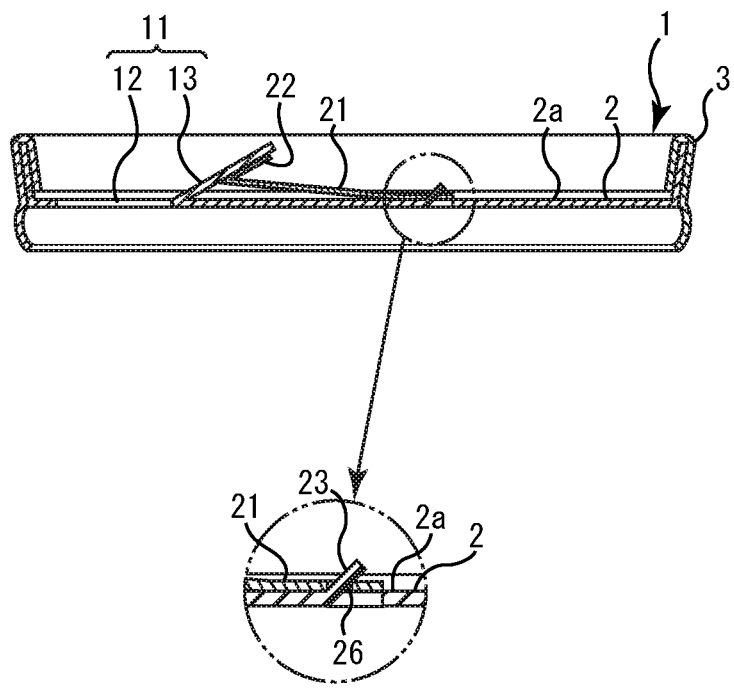

FIGS. 20 and 21 illustrate another example of seal member 21. In this example, a holding portion 23 is formed in the top lid 2, and a holding reception portion 26 is formed in the seal member 21. In a case where the holding portion 23 and the holding reception portion 26 are formed in this manner, the holding portion 23 of the top lid 2 is set in advance to stand upright from the front surface 2a of the top lid 2, and then inserted into the holding reception portion 26 formed in the seal member 21, such that the holding portion 23 is in a held state. That is, the lid piece 13 is in the opened state, and the opening portion 12 is maintained in the open state.

Figure 23:
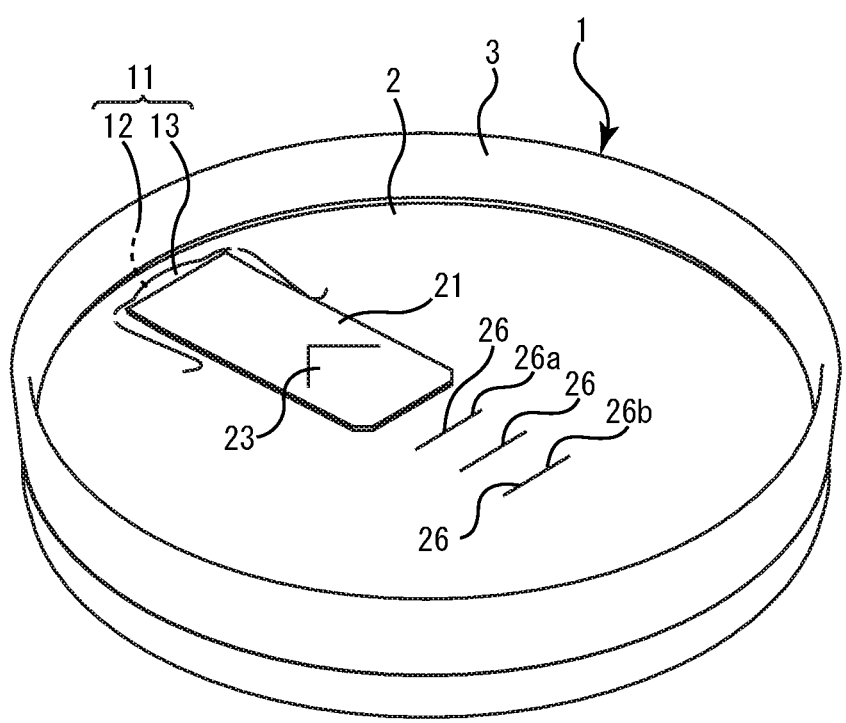
FIG. 23 is an external perspective view illustrating the lid having a holding reception portion in another aspect.
Figure 24A:
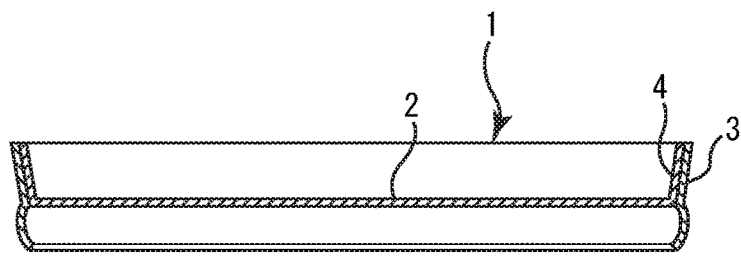
FIG. 24 is a longitudinal sectional view illustrating a sectional configuration of the lid in another aspect.
Figure 24B:
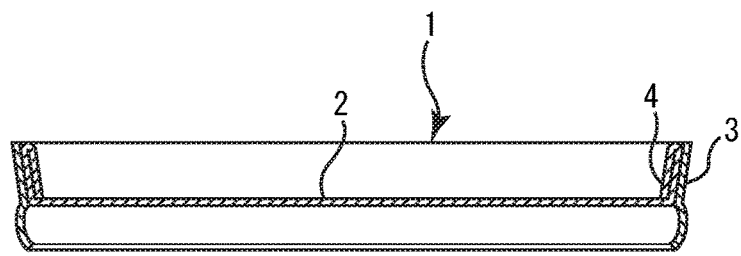
Figure 24C:
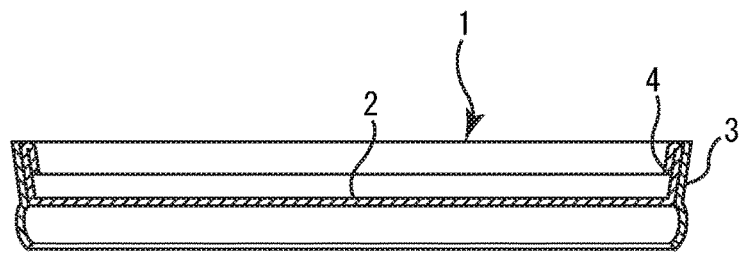
Figure 24D:
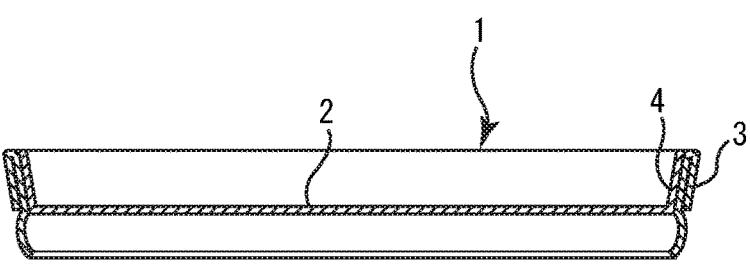
Figure 24E:
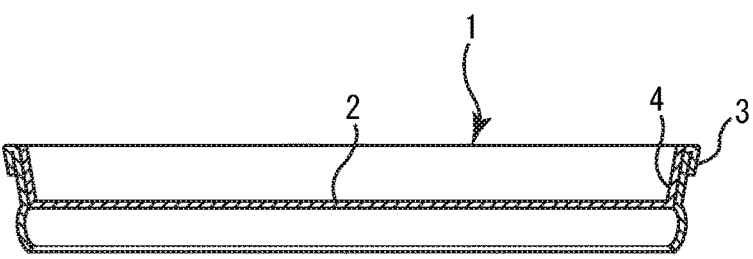
Figure 25A:
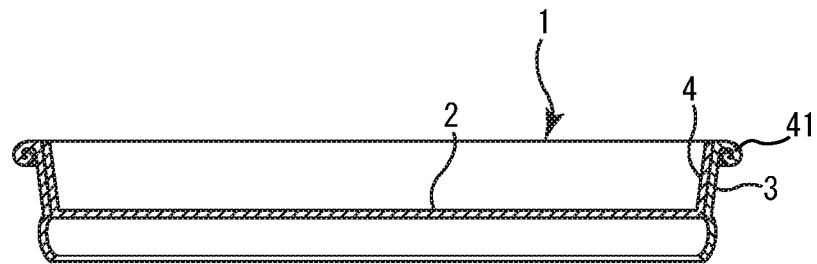
FIG. 25 is a longitudinal sectional view illustrating a sectional configuration of the lid in another aspect.
Figure 25B:
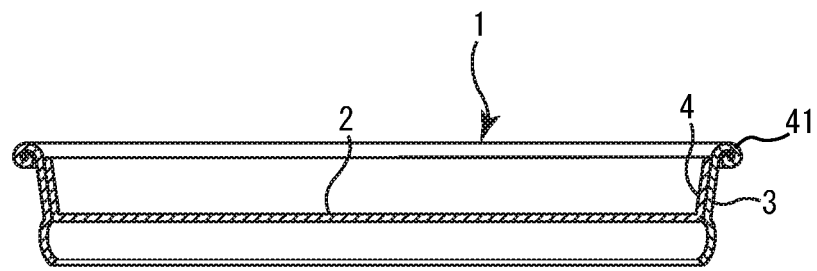
Figure 25C:
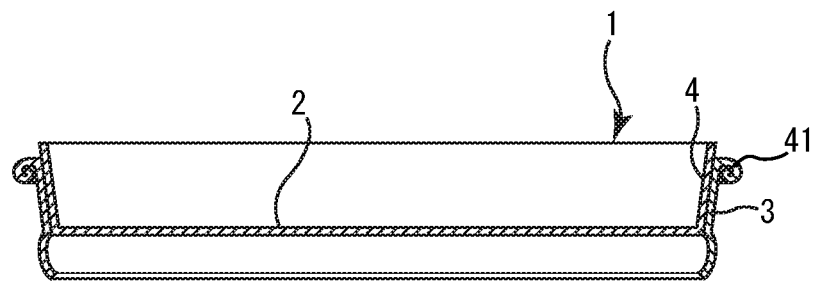
Figure 25D:
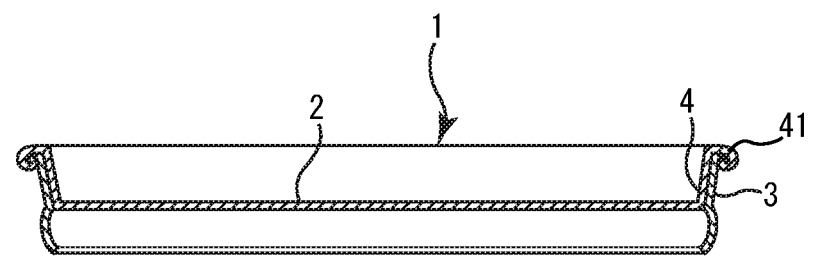
Figure 26A:
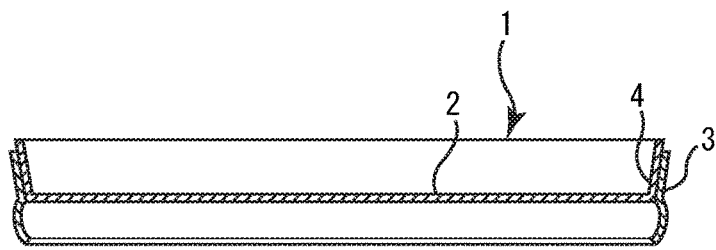
FIG. 26 is a longitudinal sectional view illustrating a sectional configuration of the lid in another aspect.
Figure 26B:
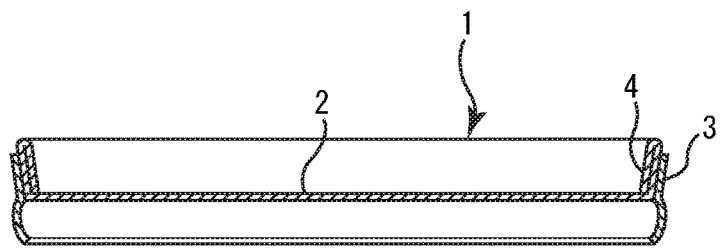
Figure 26C:
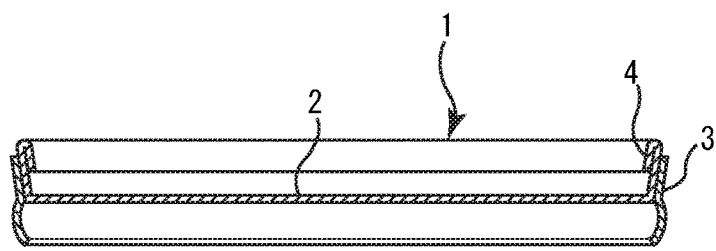
Figure 26D:
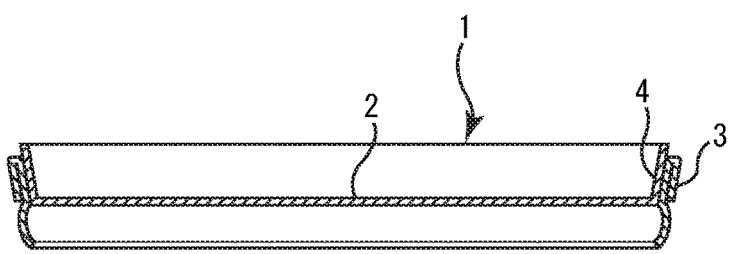
Figure 26E:
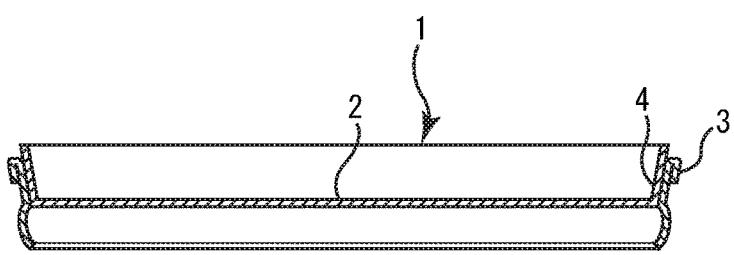
Figure 27A:
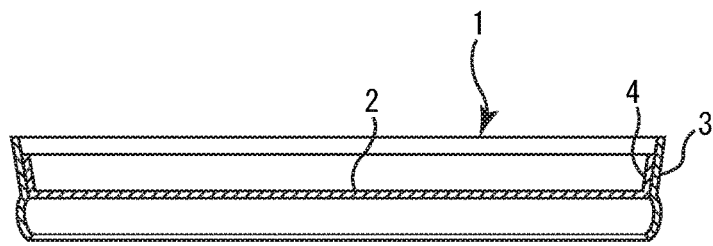
FIG. 27 is a longitudinal sectional view illustrating a sectional configuration of the lid in another aspect.
Figure 27B:
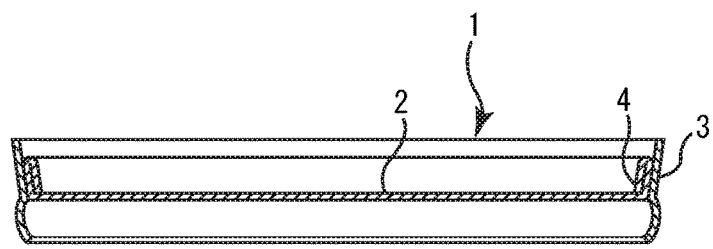
Figure 27C:
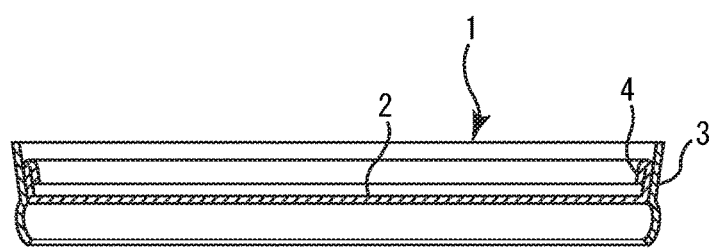
Figure 27D:
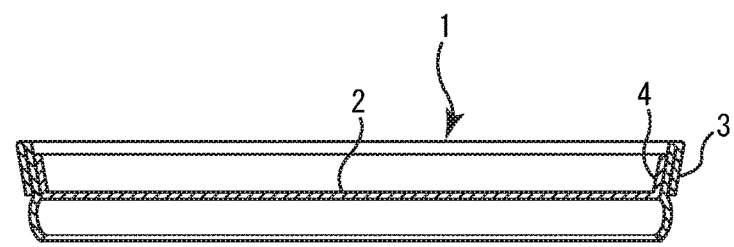
Figure 27E:
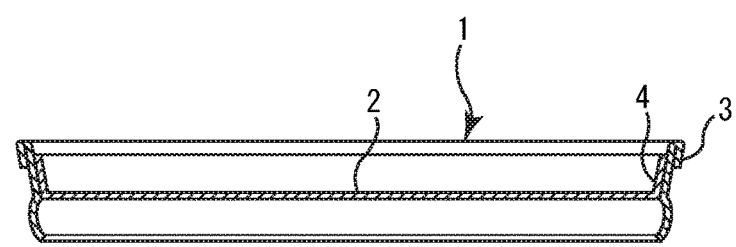

FIG. 23 illustrates another example of holding reception portion 26. This example is different from the previous examples in that holding reception portions 26 are formed at a plurality of places in the top lid 2. When the holding reception portions 26 are formed at a plurality of places stepwisely in this manner, it is possible to select a position at which the holding portion 23 is to be inserted. That is, when the holding reception portions 26 are formed at a plurality of places in this manner, it is possible to adjust how the lid piece 13 is opened. In other words, it is possible to adjust an opened state of the opening portion 12. When the holding reception portions 26 are formed in this manner, in a state where the lid is attached to the container 101, the user can adjust an amount of the contents to be discharged or the like, for example, by inserting the holding portion 23 into a holding reception portion 26a to discharge a small amount of the contents from the opening portion 12 and inserting the holding portion 23 into a holding reception portion 26b to discharge a large amount of the contents from the opening portion 12.

FIGS. 24 to 30 illustrate other examples of top lid 2 and side wall 3 in the lid according to the present invention. Note that what are illustrated here are merely examples, and other configurations of top lid 2 and side wall 3 may be used. In FIGS. 24 to 27, the description of the seal member 21 is omitted for convenience of description.

In an aspect of the lid 1 illustrated in FIG. 24, the rising portion 4 of the top lid 2 and the upper end of the side wall 3 are flush with each other. In this case, the rising portion 4 and the upper end of the side wall 3 may be flush with each other as illustrated in FIG. 24(a), or the rising portion 4 may be woven inside in such a manner that a height position of a bent portion, which is an upper end of the rising portion 4, is flush with a position of the upper end of the side wall 3 as illustrated in FIG. 24(b). Alternatively, as illustrated in FIG. 24(c), while the height position of the bent portion of the rising portion 4 is flush with the position of the upper end of the side wall 3, the folded portion of the rising portion 4 may not reach the top lid 2. Alternatively, as illustrated in FIGS. 24(d) and 24(e), a position of an upper end of a folded portion where the side wall 3 is folded outwardly may be aligned to be flush with the position of the upper end of the rising portion 4.

FIG. 25 illustrates examples in which a curled portion 41 is formed as a projecting portion at the upper end part of the lid 1. The curled portion 41 may be formed in a curled shape as illustrated in FIG. 25, or may be formed in a flange shape by crushing the curled portion. Here, the projecting portion is a concept including a portion projecting outwardly beyond the side wall 3. In an example of FIG. 25(a), the rising portion 4 and the side wall 3 are formed to be flush with each other, and the curled portion 41 is formed on the side wall 3. In an example of FIG. 25(b), the curled portion 41 is formed on the side wall 3 similarly to FIG. 25(a), but the rising portion 4 is formed to be lower than the side wall 3. In an example illustrated in FIG. 25(c), the curled portion 41 is formed on the side wall 3, and the rising portion 4 protrudes to be higher than the position of the upper end of the side wall 3. In an example illustrated in FIG. 25(d), the upper end part of the rising portion 4 is positioned to be higher than the upper end of the side wall 3, and further projects outwardly beyond the side wall 3 to form the curled portion 41. The curled portion 41 can also be formed in this manner.

When the curled portion 41 is formed, not only the strength of the side wall 3 and the top lid 2 can be increased, but also the heat insulation effect can be improved. By forming the curled portion 41, it is possible to make it difficult to feel uncomfortable hot heat on the lips and it is possible to improve mouth touch feel, for example, at the time of drinking a hot beverage or the like.

In an aspect illustrated in FIG. 26, the rising portion 4 protrudes to be higher than the side wall 3. For example, in FIG. 26(a), the rising portion 4 protrudes to be higher than the side wall 3, and in FIGS. 26(b) and 26(c), the rising portion 4 is folded inwardly, and a folded end part thereof protrudes to a position higher than the upper end of the side wall 3. In FIGS. 26(d) and 26(e), the side wall 3 is folded outwardly, and the upper end of the rising portion 4 protrudes to a position higher than a position of a folded end part of the side wall 3.

In an aspect illustrated in FIG. 27, the upper end of the rising portion 4 is formed at a position lower than the upper end of the side wall 3, contrary to FIG. 26. In an example of FIG. 27(a), the upper end of the side wall 3 is positioned higher than the upper end of the rising portion 4, and in examples of FIGS. 27(b) and 27(c), the rising portion 4 is folded inwardly, and the upper end of the side wall 3 is positioned higher than an upper end of a folded portion of the rising portion 4. In examples of FIGS. 27(d) and 27(e), the side wall 3 is folded outwardly, and a height position of a folded portion thereof is higher than the position of the upper end of the rising portion 4.

Figure 28A:
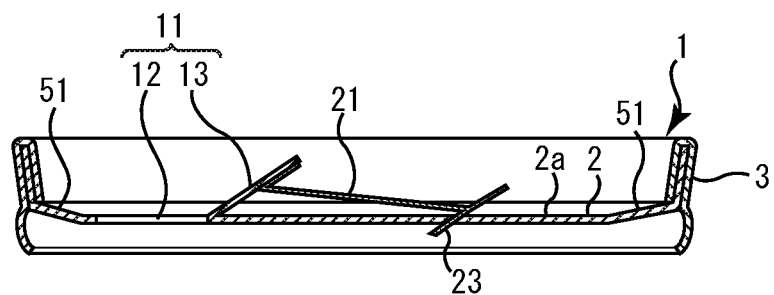
FIG. 28 is a longitudinal sectional view illustrating a sectional configuration of the lid in another aspect.
Figure 28B:
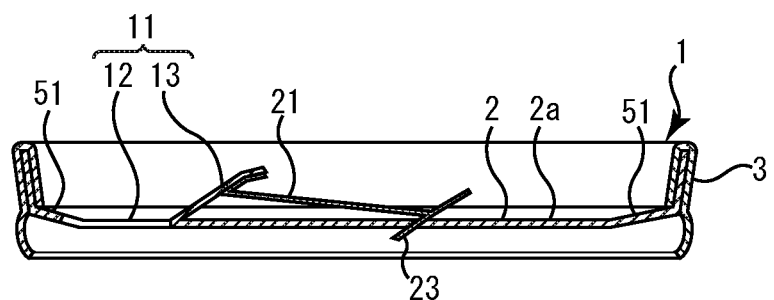
Figure 28C:
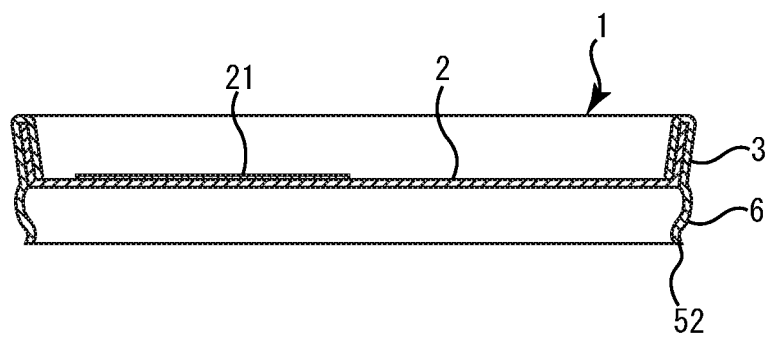
Figure 29A:
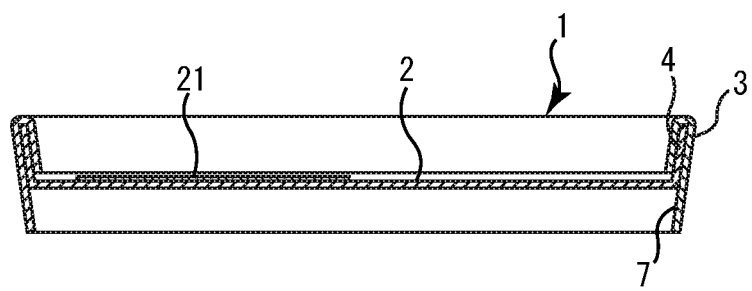
FIG. 29 is a longitudinal sectional view illustrating a sectional configuration of the lid in another aspect.
Figure 29B:
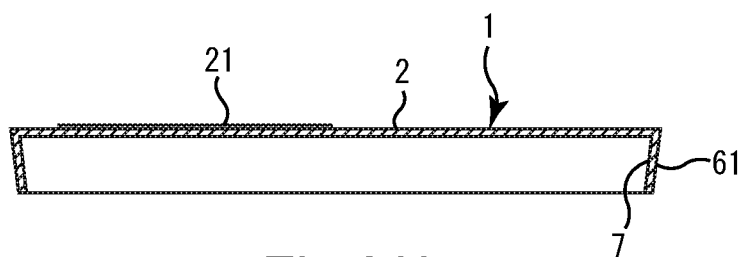
Figure 29C:
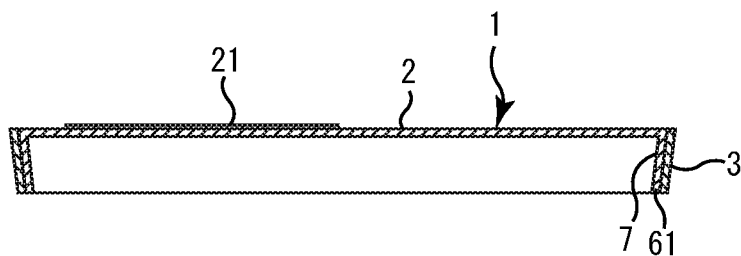
Figure 29D:
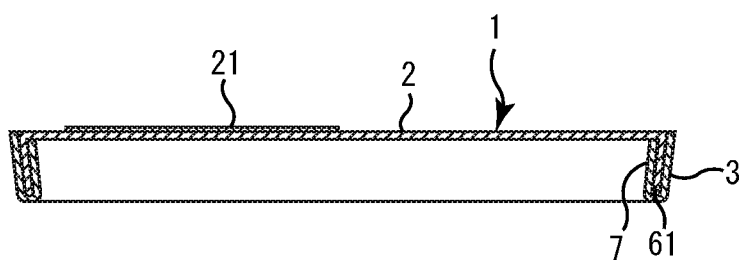
Figure 29E:
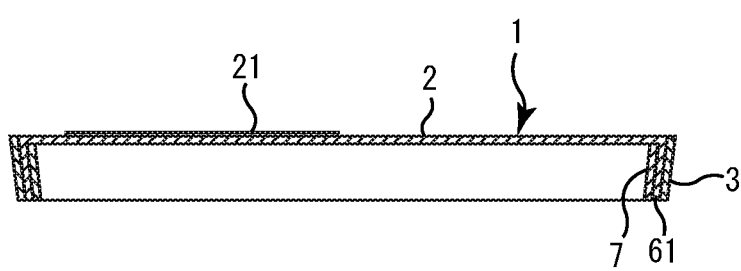

In examples illustrated in FIGS. 28(a) and 28(b), an inclined portion 51 is formed on the top lid 2. In a case where the inclined portion 51 is formed on the top lid 2 in this manner, when the top lid 2 is returned to a horizontal state from the state in which the container 101 or the lid 1 attached to the container 101 is inclined, for example, after completely drinking a beverage or the like, the beverage remaining on an inner surface of the rising portion 4 easily returns to the opening portion 12 along the inclined portion 51. By forming the inclined portion 51 in this manner, the beverage hardly remains on the front surface 2a of the top lid 2 and the like. Note that, in a case where the inclined portion 51 is formed on the top lid 2 in this manner, the opening portion 12 may be formed at a position to avoid the inclined portion 51 as illustrated in FIG. 28(a), or the opening portion 12 may be formed to include a part of the inclined portion 51 as illustrated in FIG. 28(b). In an example illustrated in FIG. 28(c), a guide portion 52 is formed at the lower end part of the lower wall 6 in the lid 1 that has been described so far. The guide portion 52 is provided to make it easy to attach the lid 1 to the container 101 when the lid 1 is attached to the container 101. By forming the guide portion 52, the lid 1 can be more smoothly attached to the container 101.

FIG. 29 illustrates other examples of forms of the engagement portion 7 formed on the lower wall 6 in the lid 1 that has been described so far. In an aspect illustrated in FIG. 29(a), the lid 1 described so far has an engagement portion 7 formed in a linearly tapered shape without bulging outwardly. In FIGS. 29(b) to 29(e), it is illustrated that an engagement portion 7 is formed in a linearly tapered shape similarly to that illustrated in FIG. 29(a), and additionally, a falling portion 61 is provided by forming a peripheral edge portion of the top lid 2 to fall, without forming the rising portion 4. The lid 1 may be formed in such a form.

Figure 30A:
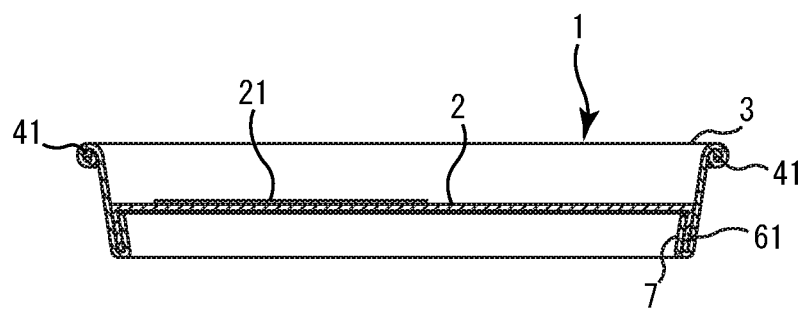
FIG. 30 is a longitudinal sectional view illustrating a sectional configuration of the lid in another aspect.
Figure 30B:
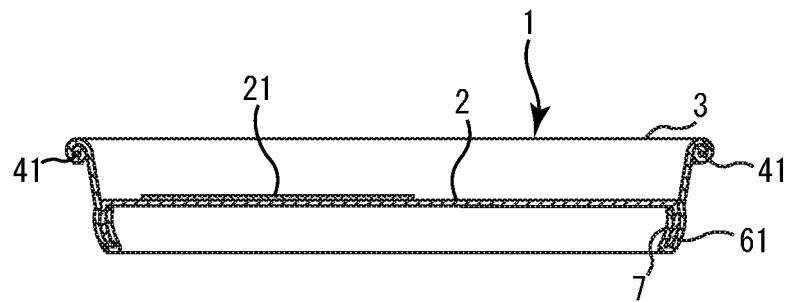

In an example of the lid 1 illustrated in FIG. 30, the peripheral edge of the top lid 2 falls to form a falling portion 61, the side wall 3 is formed to surround the periphery of the falling portion 61, and the falling portion 61 and the side wall 3 are joined to each other. In FIG. 30(*a*), the engagement portion 7 is formed in a linearly tapered shape, and in the lid 1 of FIG. 30(*b*), the engagement portion 7 bulges outwardly.

As described so far, the lid 1 according to the present invention can be applied to a lid 1 in any of such many aspects. Also, the lid 1 according to the present invention can be applied to a lid 1 in an aspect other than the above-described aspects. Although the lid according to the present invention has been described in detail above, the above description is merely an example of the lid according to the present invention, and the present invention is not limited thereto. Therefore, appropriate modifications may be made without departing from the gist of the present invention. In addition, the above-described configurations of the lids in the respective examples may be used independently of each other, or may be appropriately combined together when applied.

REFERENCE SIGNS LIST 1 lid
2 top lid
3 side wall
4 rising portion
5 upper wall
6 lower wall
7 engagement portion
11 opening forming portion
12 opening portion
13 lid piece
21 seal member
23 holding portion
26 holding reception portion

The invention claimed is:

1. A lid comprising a top lid made of a paper-based material, wherein the top lid includes
an opening portion communicating between an inside and an outside of the top lid, and
a lid piece formed to be capable of opening and/or closing the opening portion, wherein
a seal member made of the paper-based material is connected to the lid piece, the seal member being configured to open the opening portion by pulling up the lid piece,
the seal member includes one end part attached to the lid piece, another end part opposed to the one end part, and a knob portion formed at the another end part,
the lid comprises a holding portion for holding the lid piece in a state where the opening portion is opened, and a holding reception portion configured to hold the holding portion in a state where the opening portion is opened, and
the holding portion is formed by a portion of the seal member in which a cut line is formed in the seal member, and is positioned between the one end part and the knob portion.

2. The lid according to claim 1, wherein when the other end part is bent, the holding portion protrudes toward a surface of the top lid.

3. The lid according to claim 2, wherein
the holding portion is formed in a claw shape, and
the holding reception portion is formed in a cut shape in the top lid, so that the holding portion is insertable into the holding reception portion.

4. The lid according to claim 3, further comprising a side wall portion formed circumferentially to surround a periphery of the top lid, wherein the holding reception portion is formed in the side wall portion.

5. The lid according to claim 4, wherein the holding reception portion is the side wall portion.

6. The lid according to claim 2, further comprising a side wall portion formed circumferentially to surround a periphery of the top lid,
wherein the holding reception portion is formed in the side wall portion.

7. The lid according to claim 6, wherein the holding reception portion is the side wall portion.

8. The lid according to claim 1, wherein
the holding portion is formed in a claw shape, and
the holding reception portion is formed in a cut shape in the top lid, so that the holding portion is insertable into the holding reception portion.

9. The lid according to claim 8, further comprising a side wall portion formed circumferentially to surround a periphery of the top lid, wherein the holding reception portion is formed in the side wall portion.

10. The lid according to claim 9, wherein the holding reception portion is the side wall portion.

11. The lid according to claim 1, further comprising
a side wall portion formed circumferentially to surround a periphery of the top lid,
wherein the holding reception portion is formed in the side wall portion.

12. The lid according to claim 11, wherein the holding reception portion is the side wall portion.

13. A lid comprising a top lid made of a paper-based material, wherein the top lid includes,
an opening portion communicating between an inside and an outside of the top lid, and
a lid piece formed to be capable of opening and/or closing the opening portion, wherein
a seal member made of a paper-based material is connected to the lid piece, the seal member being configured to open the opening portion by pulling up the lid piece,
the seal member includes one end part attached to the lid piece, another end part opposed to the one end part, and a knob portion formed at the another end part,
the lid comprises a holding portion for holding the lid piece in a state where the opening portion is opened, and a holding reception portion configured to hold the holding portion in a state where the opening portion is opened,
the holding portion is formed in the seal member, and is positioned between the one end part and the knob portion,
when the other end part is bent, the holding portion protrudes toward a surface of the top lid, and
before the other end part is bent, the holding portion is substantially on the same plane as a surface of the seal member.

14. The lid according to claim 13, wherein
the holding portion is formed in a claw shape, and
the holding reception portion is formed in a cut shape in the top lid, so that the holding portion is insertable into the holding reception portion.

15. The lid according to claim 14, further comprising a side wall portion formed circumferentially to surround a periphery of the top lid, wherein the holding reception portion is formed in the side wall portion.

16. The lid according to claim 15, wherein the holding reception portion is the side wall portion.

17. The lid according to claim 13, further comprising a side wall portion formed circumferentially to surround a periphery of the top lid, wherein the holding reception portion is formed in the side wall portion.

18. The lid according to claim 17, wherein the holding reception portion is the side wall portion.

* * * * *